(12) United States Patent
Khoshnevisan et al.

(10) Patent No.: US 12,375,233 B2
(45) Date of Patent: Jul. 29, 2025

(54) SOUNDING REFERENCE SIGNAL RESOURCE SET GROUP SWITCHING

(71) Applicant: QUALCOMM Incorporated, San Diego, CA (US)

(72) Inventors: Mostafa Khoshnevisan, San Diego, CA (US); Yitao Chen, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 17/661,938

(22) Filed: May 4, 2022

(65) Prior Publication Data

US 2023/0361953 A1   Nov. 9, 2023

(51) Int. Cl.
   *H04L 5/00* (2006.01)
   *H04L 1/1812* (2023.01)
   *H04W 72/23* (2023.01)

(52) U.S. Cl.
   CPC .......... *H04L 5/0048* (2013.01); *H04L 1/1812* (2013.01); *H04W 72/23* (2023.01)

(58) Field of Classification Search
   None
   See application file for complete search history.

(56) References Cited

U.S. PATENT DOCUMENTS

| | | | |
|---|---|---|---|
| 11,997,606 B2* | 5/2024 | Zhou | H04L 5/0051 |
| 12,069,582 B2* | 8/2024 | Cirik | H04W 74/0833 |
| 12,069,678 B2* | 8/2024 | Park | H04L 5/0048 |
| 2019/0274155 A1* | 9/2019 | Bhattad | H04L 5/0073 |
| 2019/0349964 A1* | 11/2019 | Liou | H04B 7/0626 |
| 2022/0014328 A1 | 1/2022 | Sakhnini et al. | |
| 2022/0166468 A1* | 5/2022 | Go | H04B 7/0456 |
| 2022/0174510 A1* | 6/2022 | Kang | H04L 5/0098 |
| 2022/0248329 A1* | 8/2022 | Peng | H04W 52/0235 |

(Continued)

FOREIGN PATENT DOCUMENTS

| | | |
|---|---|---|
| WO | 2021178788 A1 | 9/2021 |
| WO | 2021258088 A2 | 12/2021 |
| WO | 2021259159 A1 | 12/2021 |

OTHER PUBLICATIONS

International Search Report and Written Opinion—PCT/US2023/017421—ISA/EPO—Jun. 26, 2023.

*Primary Examiner* — Bob A Phunkulh
(74) *Attorney, Agent, or Firm* — Arun Swain

(57) ABSTRACT

Various aspects of the present disclosure generally relate to wireless communication. In some aspects, a user equipment (UE) may receive configuration information, associated with a first sounding reference signal (SRS) resource set, indicating that a first one or more groups of SRS resource sets, from multiple groups of SRS resource sets, are associated with the first SRS resource set. The UE may receive an indication that a first group, from the multiple groups, is activated for SRS transmissions, the first group being included in the first one or more groups that are associated with the first SRS resource set. The UE may transmit an SRS using an SRS resource associated with the first SRS resource set based at least in part on the first group being activated and the first group being included in the first one or more groups. Numerous other aspects are provided.

27 Claims, 13 Drawing Sheets

(56) References Cited

U.S. PATENT DOCUMENTS

| | | | |
|---|---|---|---|
| 2023/0283430 A1* | 9/2023 | Zhu | H04B 7/0404 370/329 |
| 2023/0396385 A1* | 12/2023 | Kwak | H04W 72/232 |
| 2024/0187176 A1* | 6/2024 | Wang | H04W 72/23 |
| 2024/0214947 A1* | 6/2024 | Park | H04L 5/0053 |

* cited by examiner

SOUNDING REFERENCE SIGNAL RESOURCE SET GROUP SWITCHING

FIELD OF THE DISCLOSURE

Aspects of the present disclosure generally relate to wireless communication and specifically, to techniques and apparatuses for sounding reference signal (SRS) resource set group switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A sounding reference signal (SRS) may carry information used for uplink channel estimation, which may be used for scheduling, link adaptation, precoder selection, or beam management, among other examples. A network entity may configure one or more SRS resource sets for a user equipment (UE), and the UE may transmit SRSs on the configured SRS resource sets. An SRS resource set may have a configured usage, such as uplink channel state information (CSI) acquisition, downlink CSI acquisition for reciprocity-based operations, or uplink beam management, among other examples. The network entity may measure the SRSs, may perform channel estimation based at least in part on the measurements, and may use the SRS measurements to configure communications with the UE.

Although interference planning, group hopping, sequence hopping, or frequency hopping techniques may reduce or randomize some SRS interference at a receiver (such as at a network entity), SRSs may nonetheless still interfere with one another. For example, in coherent joint transmission (CJT) schemes, one or more UEs are coherently served by multiple transmission reception points (TRPs) or multiple network entities, and thus the network may need information about channels between each TRP and a given UE in order to select transmission weights or other transmission parameters. Accordingly, each TRP of the multiple TRPs may need to receive SRS transmissions from a given UE, resulting in the UE transmitting an SRS transmission with a large amount of power, thus increasing the likelihood of the SRS transmission reaching other network entities and causing interference. This may be particularly problematic when a large quantity of CJT UEs are near to one another, requiring multiple UEs to send SRS transmissions on the same OFDM symbols, thus increasing the likelihood of inter-cell or inter-cluster interference at the various receivers. In such scenarios, interference mitigation techniques performed by the UE or the network entity may insufficiently mitigate SRS interference, leading to degraded SRS reception and channel quality, and overall poor link performance including high latency, low throughput, or link failure.

As described above, in some cases, multiple TRPs may be associated with receiving an SRS transmitted by a UE, resulting in an increased transmission power associated with the SRS. The increased transmission power may result in an increased likelihood of interference within the wireless network. One technique to mitigate the interference may be to configure UEs to transmit SRSs less frequently in time (for example, sparser SRS transmissions). As another example, the network entity may stagger SRS transmissions of different UEs in time so as to reduce the interference caused by the SRS transmissions.

However, as channel conditions change over time, the sparser periodicity of SRS transmissions may become insufficient for enabling the network entity to perform accurate channel estimations. For example, a change in downlink traffic patterns or types or a change in scheduling decisions (such as multi-user grouping) can result in a change in SRS periodicity that is needed to enable accurate channel estimations for some UEs. For example, to balance between interference mitigation (for example, associated with less frequent SRS transmissions or other adjusted SRS configuration parameters) and improved channel estimations (for example, associated with more frequent SRS transmissions or other adjusted SRS configuration parameters) over time, a periodicity, a comb spacing, a comb offset, an SRS sequence, a cyclic shift, or other SRS configuration parameters may be changed or updated (for example, by the network entity).

However, updating or changing SRS configuration parameters may be associated with radio resource control (RRC) signaling. For example, the network entity may reconfigure one or more parameters associated with an SRS resource set via one or more RRC communications (for example, via an RRC reconfiguration communication). RRC signaling is associated with high latency and an RRC reconfiguration procedure may be non-synchronous. As a result, a UE may be configured with SRS configuration parameters for some time that result in interference or poor channel estimations (for example, performed by the network entity), leading to degraded SRS reception and channel quality, and overall poor link performance including high latency, low throughput, or link failure.

SUMMARY

Some aspects described herein relate to a user equipment (UE) for wireless communication. The UE may include at least one memory and at least one processor communicatively coupled with the at least one memory. The at least one processor may be configured to cause the UE to receive, from a network entity, configuration information, associated with a first sounding reference signal (SRS) resource set, indicating that a first one or more groups of SRS resource sets, from multiple groups of SRS resource sets, are associated with the first SRS resource set. The at least one processor may be configured to cause the UE to receive, from the network entity, an indication that a first group, from the multiple groups, is activated for SRS transmissions, the first group being included in the first one or more groups that are associated with the first SRS resource set. The at least one processor may be configured to cause the UE to transmit an SRS using an SRS resource associated with the first SRS resource set based at least in part on the first group being activated and the first group being included in the first one or more groups.

Some aspects described herein relate to a network entity for wireless communication. The network entity may include at least one memory and at least one processor communicatively coupled with the at least one memory. The at least one processor may be configured to cause the network entity to transmit configuration information intended for a UE, associated with a first SRS resource set, indicating that a first one or more groups of SRS resource sets, from multiple groups of SRS resource sets, are associated with the first SRS resource set. The at least one processor may be configured to cause the network entity to transmit an indication that a first group, from the multiple groups, is activated for SRS transmissions, the first group being included in the first one or more groups that are associated with the first SRS resource set. The at least one processor may be configured to cause the network entity to receive an SRS using an SRS resource associated with the first SRS resource set based at least in part on the first group being activated and the first group being included in the first one or more groups.

Some aspects described herein relate to a method of wireless communication performed by a UE. The method may include receiving, from a network entity, configuration information, associated with a first SRS resource set, indicating that a first one or more groups of SRS resource sets, from multiple groups of SRS resource sets, are associated with the first SRS resource set. The method may include receiving, from the network entity, an indication that a first group, from the multiple groups, is activated for SRS transmissions, the first group being included in the first one or more groups that are associated with the first SRS resource set. The method may include transmitting an SRS using an SRS resource associated with the first SRS resource set based at least in part on the first group being activated and the first group being included in the first one or more groups.

Some aspects described herein relate to a method of wireless communication performed by a network entity. The method may include transmitting configuration information intended for a UE, associated with a first SRS resource set, indicating that a first one or more groups of SRS resource sets, from multiple groups of SRS resource sets, are associated with the first SRS resource set. The method may include transmitting an indication that a first group, from the multiple groups, is activated for SRS transmissions, the first group being included in the first one or more groups that are associated with the first SRS resource set. The method may include receiving an SRS using an SRS resource associated with the first SRS resource set based at least in part on the first group being activated and the first group being included in the first one or more groups.

Some aspects described herein relate to a non-transitory computer-readable medium that stores a set of instructions for wireless communication by a UE. The set of instructions, when executed by one or more processors of the UE, may cause the UE to receive, from a network entity, configuration information, associated with a first SRS resource set, indicating that a first one or more groups of SRS resource sets, from multiple groups of SRS resource sets, are associated with the first SRS resource set. The set of instructions, when executed by one or more processors of the UE, may cause the UE to receive, from the network entity, an indication that a first group, from the multiple groups, is activated for SRS transmissions, the first group being included in the first one or more groups that are associated with the first SRS resource set. The set of instructions, when executed by one or more processors of the UE, may cause the UE to transmit an SRS using an SRS resource associated with the first SRS resource set based at least in part on the first group being activated and the first group being included in the first one or more groups.

Some aspects described herein relate to a non-transitory computer-readable medium that stores a set of instructions for wireless communication by a network entity. The set of instructions, when executed by one or more processors of the network entity, may cause the network entity to transmit configuration information intended for a UE, associated with a first SRS resource set, indicating that a first one or more groups of SRS resource sets, from multiple groups of SRS resource sets, are associated with the first SRS resource set. The set of instructions, when executed by one or more processors of the network entity, may cause the network entity to transmit an indication that a first group, from the multiple groups, is activated for SRS transmissions, the first group being included in the first one or more groups that are associated with the first SRS resource set. The set of instructions, when executed by one or more processors of the network entity, may cause the network entity to receive an SRS using an SRS resource associated with the first SRS resource set based at least in part on the first group being activated and the first group being included in the first one or more groups.

Some aspects described herein relate to an apparatus for wireless communication. The apparatus may include means for receiving, from a network entity, configuration information, associated with a first SRS resource set, indicating that a first one or more groups of SRS resource sets, from multiple groups of SRS resource sets, are associated with the first SRS resource set. The apparatus may include means for receiving, from the network entity, an indication that a first group, from the multiple groups, is activated for SRS transmissions, the first group being included in the first one or more groups that are associated with the first SRS resource set. The apparatus may include means for transmitting an SRS using an SRS resource associated with the first SRS resource set based at least in part on the first group being activated and the first group being included in the first one or more groups.

Some aspects described herein relate to an apparatus for wireless communication. The apparatus may include means for transmitting configuration information intended for a UE, associated with a first SRS resource set, indicating that a first one or more groups of SRS resource sets, from multiple groups of SRS resource sets, are associated with the first SRS resource set. The apparatus may include means for transmitting an indication that a first group, from the multiple groups, is activated for SRS transmissions, the first group being included in the first one or more groups that are associated with the first SRS resource set. The apparatus may include means for receiving an SRS using an SRS resource associated with the first SRS resource set based at least in part on the first group being activated and the first group being included in the first one or more groups.

Aspects generally include a method, apparatus, system, computer program product, non-transitory computer-readable medium, user equipment, base station, network entity, network node, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
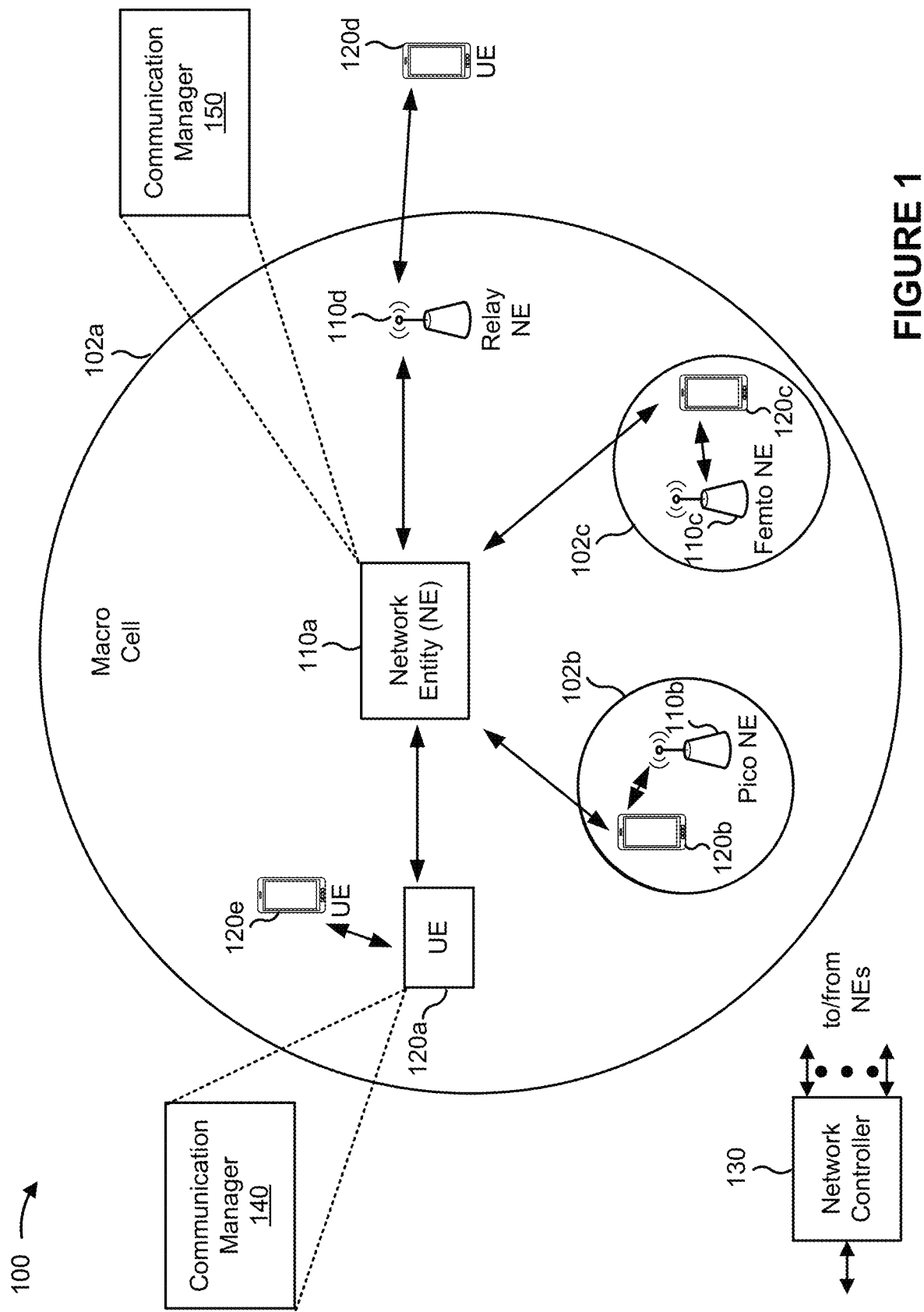
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to sounding reference signal (SRS) resource set group switching. Some aspects more specifically relate to a network entity configuring multiple SRS resource set groups, where different groups include SRS resource sets associated with different SRS configuration parameters. For example, a first SRS resource set group may include one or more SRS resource sets associated with a first periodicity or a first slot offset, among other examples. A second SRS resource set group may include one or more SRS resource sets associated with a second periodicity or a second slot offset, among other examples. The network entity may activate a given SRS resource set group at a given time and may be enabled to switch active SRS resource set groups over time. When an SRS resource set group is active, a user equipment (UE) may transmit SRSs in accordance with the configuration of SRS resource sets included in the SRS resource set group. The UE may refrain from transmitting SRSs associated with SRS resource sets that are not included in the active SRS resource set group.

For example, a UE may receive configuration information, associated with a first SRS resource set, indicating that a first one or more groups of SRS resource sets, from multiple groups of SRS resource sets, are associated with the first SRS resource set. The UE 120 may receive an indication (for example, via a medium access control (MAC) control element (MAC-CE) communication, a downlink control information (DCI) communication, or an expiration of a timer, among other examples) that a first group, from the multiple groups, is activated for SRS transmissions, the first group being included in the first one or more groups that are associated with the first SRS resource set. The UE may transmit an SRS using an SRS resource associated with the first SRS resource set based at least in part on the first group being activated and the first group being included in the first one or more groups. In some aspects, the UE may refrain from transmitting SRSs using SRS resources associated with a second SRS resource set based at least in part on the first group being activated and the first group not being included in a second one or more groups that are associated with the second SRS resource set.

Particular aspects of the subject matter described in this disclosure can be implemented to realize one or more of the following potential advantages. In some examples, the described techniques can be used to enable the network entity to quickly and dynamically adjust SRS configuration parameters associated with SRS transmissions by a UE. For example, by switching between different SRS resource set groups, the network entity may cause the UE 120 to transmit SRSs with different periodicities, slot offsets, comb spacings, comb offsets, SRS sequences, cyclic shifts, or other SRS configuration parameters, over time, without performing an RRC reconfiguration for an SRS resource set. This may reduce a latency associated with causing the UE to transmit SRSs in accordance with different SRS configuration parameters. Additionally, this may reduce interference caused by SRS transmissions or improve channel estimations performed by the network entity, such as in coherent joint transmission (CJT) scenarios that include SRS transmissions to multiple network entities or multiple transmission reception points (TRPs).

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network entities 110 (shown as a network entity (NE) 110a, a network entity 110b, a network entity 110c, and a network entity 110d), a user equipment (UE) 120 or multiple UEs 120 (shown as a UE 120a, a UE 120b, a UE 120c, a UE 120d, and a UE 120e), or other network entities. A network entity 110 is an entity that communicates with UEs 120. As shown, a network entity 110 may include one or more network entities. For example, a network entity 110 may be an aggregated network entity, meaning that the aggregated network node is configured to utilize a radio protocol stack that is physically or logically integrated within a single RAN node (for example, within a single device or unit). As another example, a network entity 110 may be a disaggregated network node (sometimes referred to as a disaggregated base station), meaning that the network entity 110 includes two or more non-co-located network nodes. A disaggregated network entity may be configured to utilize a protocol stack that is physically or logically distributed among two or more nodes (such as one or more central units (CUs), one or more distributed units (DUs), or one or more radio units (RUs)).

In some examples, a network entity 110 includes an entity that communicates with UEs 120 via a radio access link, such as an RU. In some examples, a network entity 110 includes an entity that communicates with other network entities 110 via a fronthaul link or a midhaul link, such as a DU. In some examples, a network entity 110 includes an entity that communicates with other network entities 110 via a midhaul link or a core network via a backhaul link, such as a CU. In some examples, a network entity 110 (such as an aggregated network entity 110 or a disaggregated network entity 110) may include multiple network entities, such as one or more RUs, one or more CUs, or one or more DUs. A network entity 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network entities 110 may be interconnected to one another or to one or more other network entities 110 in the wireless network 100 through various types of fronthaul, midhaul, or backhaul interfaces, such as a direct physical connection, an air interface, or a virtual network, using any suitable transport network. In some examples, a network entity 110 may provide communication coverage for a particular geographic area. In the Third Generation Partnership Project (3GPP), the term "cell" can refer to a coverage area of a network entity 110 or a network entity subsystem serving this coverage area, depending on the context in which the term is used.

A network entity 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network entity 110 for a macro cell may be referred to as a macro network entity. A network entity 110 for a pico cell may be referred to as a pico network entity. A network entity 110 for a femto cell may be referred to as a femto network entity or an in-home network entity.

The wireless network 100 may be a heterogeneous network that includes network entities 110 of different types, such as macro network entities, pico network entities, femto network entities, or relay network entities. These different types of network entities 110 may have different transmit power levels, different coverage areas, or different impacts on interference in the wireless network 100. For example, macro network entities may have a high transmit power level (for example, 5 to 40 watts) whereas pico network entities, femto network entities, and relay network entities may have lower transmit power levels (for example, 0.1 to 2 watts). In the example shown in FIG. 1, the network entity 110a may be a macro network entity for a macro cell 102a, the network entity 110b may be a pico network entity for a pico cell 102b, and the network entity 110c may be a femto network entity for a femto cell 102c. A network entity 110 may support one or multiple (for example, three) cells. A network controller 130 may couple to or communicate with a set of network entities 110 and may provide coordination and control for these network entities 110. The network controller 130 may communicate with the network entities 110 via a backhaul communication link or a midhaul communication link. The network entities 110 may communicate with one another directly or indirectly via a wireless or wireline backhaul communication link. In some aspects, the network controller 130 may include a CU or a core network device. In some examples, a cell may not necessarily be stationary, and the geographic area of the cell may move in accordance with the location of a network entity 110 that is mobile (for example, a mobile network entity).

In some aspects, the term "base station" or "network entity" may refer to an aggregated base station, a disaggregated base station, an integrated access and backhaul (IAB) node, a relay node, or one or more components thereof. For example, in some aspects, "base station" or "network entity" may refer to a CU, a DU, an RU, a Near-Real Time (Near-RT) RAN Intelligent Controller (RIC), or a Non-Real Time (Non-RT) MC, or a combination thereof. In some aspects, the term "base station" or "network entity" may refer to one device configured to perform one or more functions, such as those described herein in connection with the network entity 110. In some aspects, the term "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is an entity that can receive a transmission of data from an upstream station (for example, a network entity 110 or a UE 120) and send a transmission of the data to a downstream station (for example, a UE 120 or a network entity 110). A relay station may be a UE 120 that can relay transmissions for other UEs 120. In the example shown in FIG. 1, the network entity 110d (for example, a relay network entity) may communicate with the network entity 110a (for example, a macro network entity) and the UE 120d in order to facilitate communication between the network entity 110a and the UE 120d. A network entity 110 that relays communications may be referred to as a relay station, a relay network entity, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network entity, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network entity 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network entity 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network entity, configuration information, associated with a first SRS resource set, indicating that a first one or more groups of SRS resource sets, from multiple groups of SRS resource sets, are associated with the first SRS resource set; receive, from the network entity, an indication that a first group, from the multiple groups, is activated for SRS transmissions, the first group being included in the first one or more groups that are associated with the first SRS resource set; and transmit an SRS using an SRS resource associated with the first SRS resource set based at least in part on the first group being activated and the first group being included in the first one or more groups. Additionally or alternatively, the communication manager 140 may perform one or more other operations described herein.

In some aspects, the network entity 110 may include a communication manager 150. As described in more detail elsewhere herein, the communication manager 150 may transmit configuration information intended for a UE, associated with a first SRS resource set, indicating that a first one or more groups of SRS resource sets, from multiple groups of SRS resource sets, are associated with the first SRS resource set; transmit an indication that a first group, from the multiple groups, is activated for SRS transmissions, the first group being included in the first one or more groups that are associated with the first SRS resource set; and receive an SRS using an SRS resource associated with the first SRS resource set based at least in part on the first group being activated and the first group being included in the first one or more groups. Additionally or alternatively, the communication manager 150 may perform one or more other operations described herein.

Figure 2:
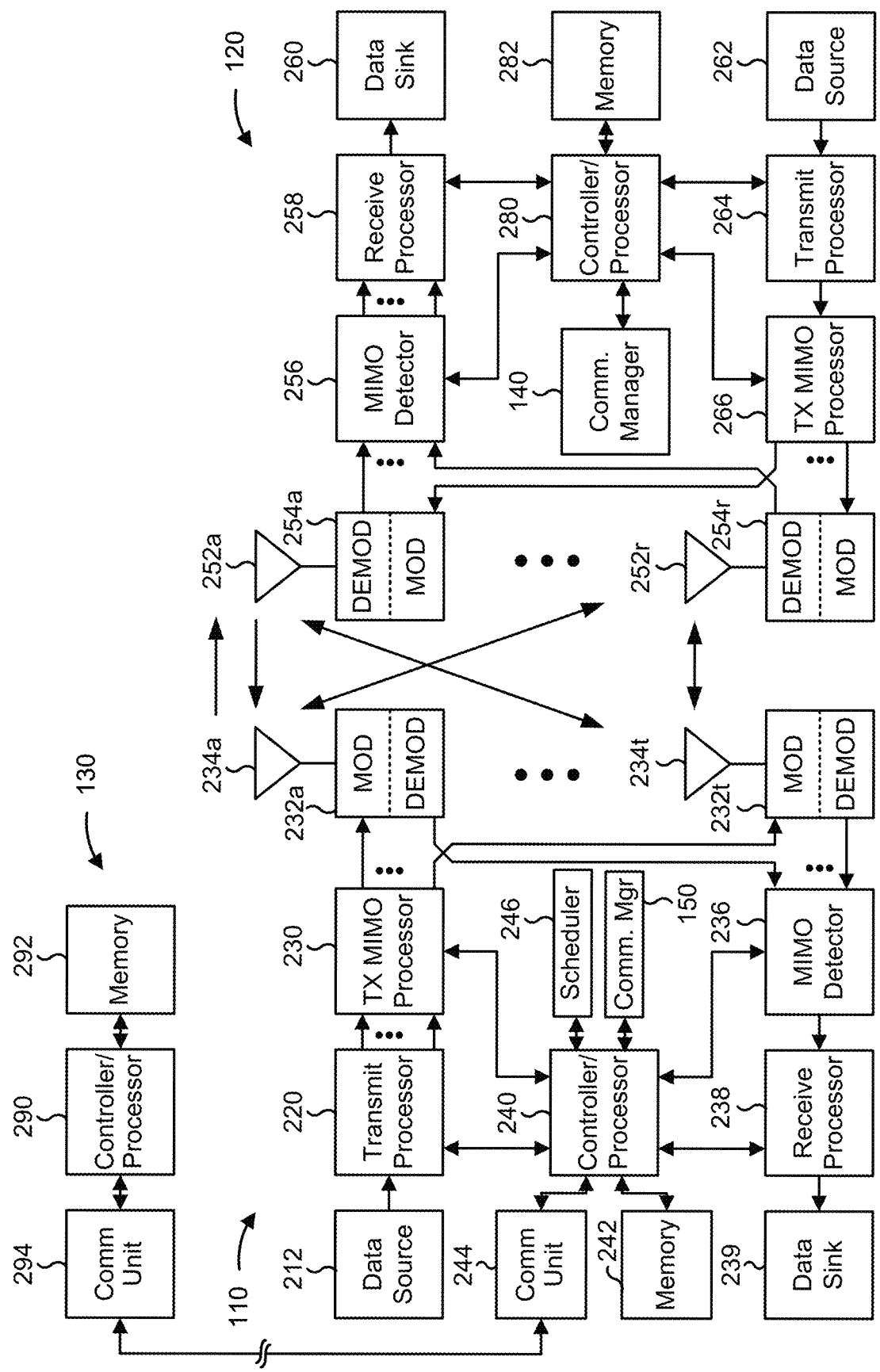
FIG. 2 is a diagram illustrating an example base station in communication with a user equipment (UE) in a wireless network in accordance with the present disclosure.

FIG. 2 is a diagram illustrating an example network entity in communication with a UE in a wireless network in accordance with the present disclosure. The network entity may correspond to the network entity 110 of FIG. 1. Similarly, the UE may correspond to the UE 120 of FIG. 1. The network entity 110 may be equipped with a set of antennas 234a through 234t, such as T antennas (T≥1). The UE 120 may be equipped with a set of antennas 252a through 252r, such as R antennas (R≥1). The network entity 110 of the example depicted in FIG. 2 includes one or more radio frequency components, such as antennas 234 and a modem 254. In some examples, a network entity 110 may include an interface, a communication component, or another component that facilitates communication with the UE 120 or another network entity. Some network entities 110 may not include radio frequency components that facilitate direct communication with the UE 120, such as one or more CUs, or one or more DUs.

At the network entity 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network entity 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network entity 110 or other network entities 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network entity 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network entity 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network entity 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity 110 may include a communication unit 244 and may communicate with the network controller 130 via the communication unit 244. The network entity 110 may include a scheduler 246 to schedule one or more UEs 120 for downlink or uplink communications. In some examples, the modem 232 of the network entity 110 may include a modulator and a demodulator. In some examples, the network entity 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network entity 110, the controller/processor 280 of the UE 120, or any other component(s) of FIG. 2 may perform one or more techniques associated with SRS resource set group switching, as described in more detail elsewhere herein. For example, the controller/processor 240 of the network entity 110, the controller/processor 280 of the UE 120, or any other component(s) of FIG. 2 may perform or direct operations of, for example, process 1000 of FIG. 10, process 1100 of FIG. 11, or other processes as described herein. The memory 242 and the memory 282 may store data and program codes for the network entity 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network entity 110 or the UE 120, may cause the one or more processors, the UE 120, or the network entity 110 to perform or direct operations of, for example, process 1000 of FIG. 10, process 1100 of FIG. 11, or other processes as described herein. In some examples, executing instructions may include running the instructions, converting the instructions, compiling the instructions, or interpreting the instructions, among other examples.

In some aspects, the UE 120 includes means for receiving, from a network entity, configuration information, associated with a first SRS resource set, indicating that a first one or more groups of SRS resource sets, from multiple groups of SRS resource sets, are associated with the first SRS resource set; means for receiving, from the network entity, an indication that a first group, from the multiple groups, is activated for SRS transmissions, the first group being included in the first one or more groups that are associated with the first SRS resource set; or means for transmitting an SRS using an SRS resource associated with the first SRS resource set based at least in part on the first group being activated and the first group being included in the first one or more groups. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity 110 includes means for transmitting configuration information intended for a UE, associated with a first SRS resource set, indicating that a first one or more groups of SRS resource sets, from multiple groups of SRS resource sets, are associated with the first SRS resource set; means for transmitting an indication that a first group, from the multiple groups, is activated for SRS transmissions, the first group being included in the first one or more groups that are associated with the first SRS resource set; or means for receiving an SRS using an SRS resource associated with the first SRS resource set based at least in part on the first group being activated and the first group being included in the first one or more groups. In some aspects, the means for the network entity 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as a CU, one or more DUs, or one or more RUs). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
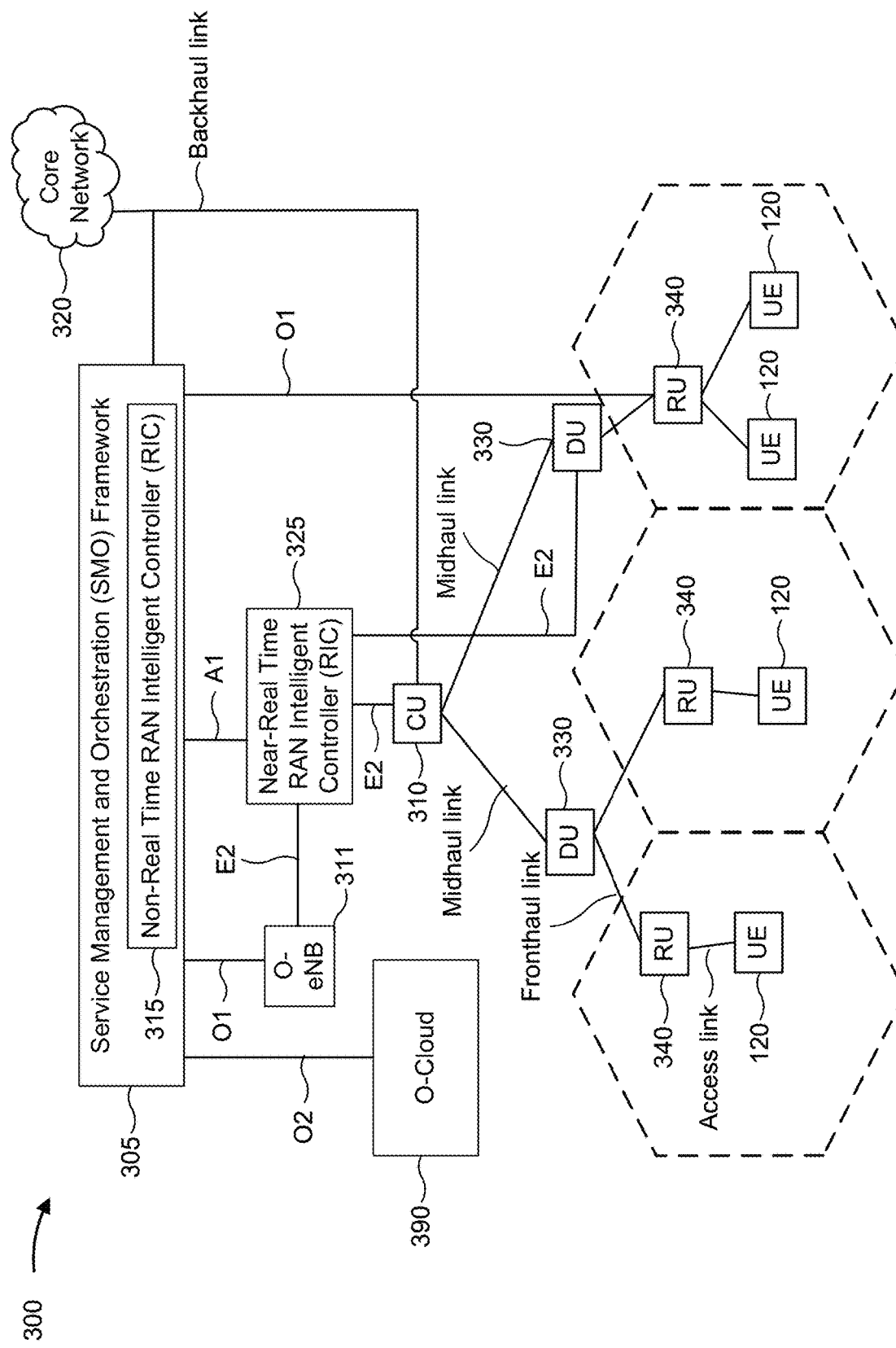
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
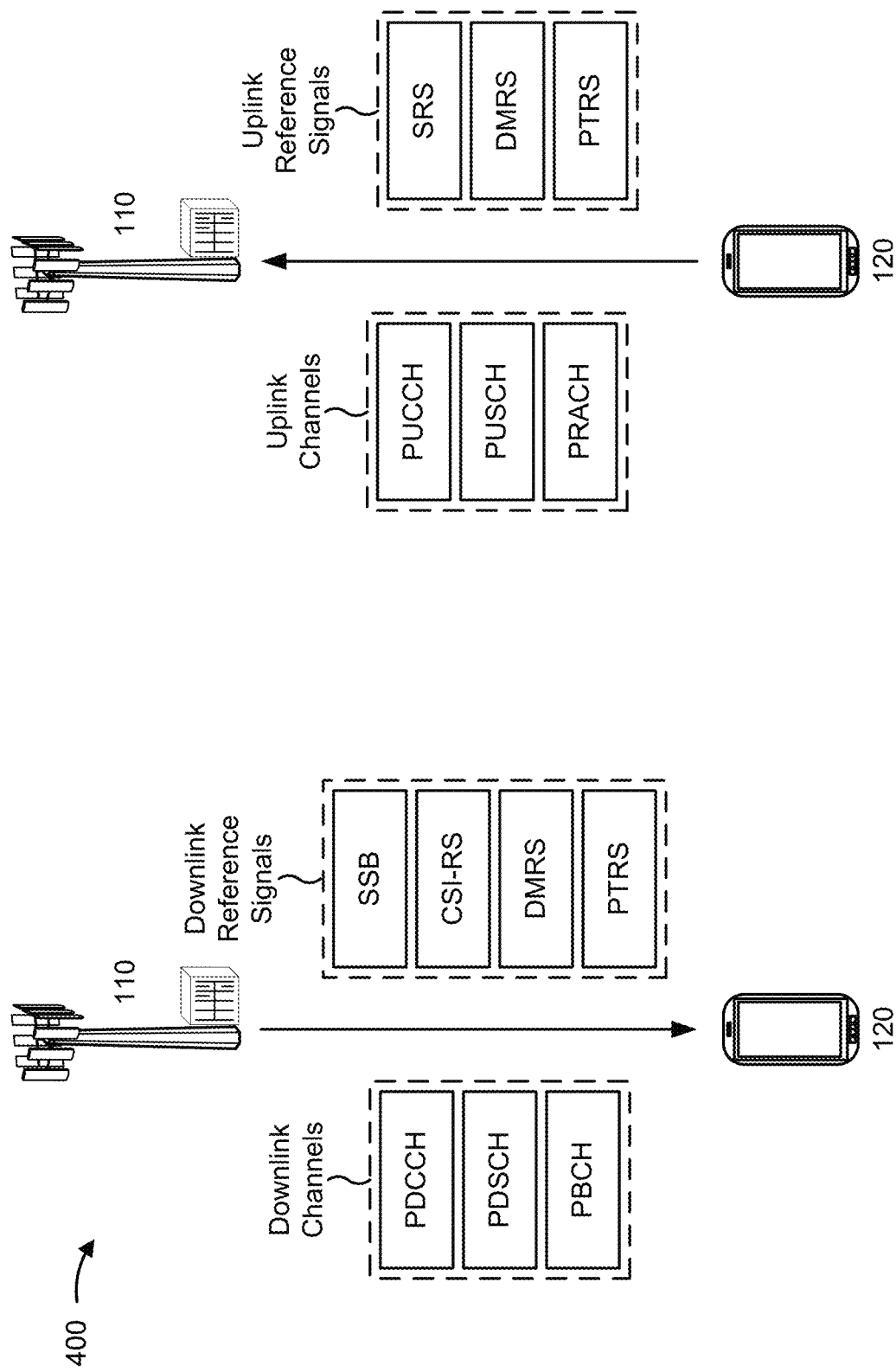
FIG. 4 is a diagram illustrating an example of physical channels and reference signals in a wireless network, in accordance with the present disclosure.

FIG. 4 is a diagram illustrating an example of physical channels and reference signals 400 in a wireless network, in accordance with the present disclosure. As shown in FIG. 4, downlink channels and downlink reference signals may carry information from a network entity 110 to a UE 120, and uplink channels and uplink reference signals may carry information from a UE 120 to a network entity 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some examples, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some examples, the UE 120 may transmit acknowledgement (ACK) or negative acknowledgement (NACK) feedback (for example, ACK/NACK feedback or ACK/NACK information) in UCI on the PUCCH or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some examples, the network entity 110 may transmit multiple SSBs on multiple corresponding beams, and the SSBs may be used for beam selection.

A CSI-RS may carry information used for downlink channel estimation (for example, downlink CSI acquisition), which may be used for scheduling, link adaptation, or beam management, among other examples. The network entity 110 may configure a set of CSI-RSs for the UE 120, and the UE 120 may measure the configured set of CSI-RSs. Based at least in part on the measurements, the UE 120 may perform channel estimation and may report channel estimation parameters to the network entity 110 (for example, in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network entity 110 may use the CSI report to select transmission parameters for downlink communications to the UE 120, such as a quantity of transmission layers (for example, a rank), a precoding matrix (for example, a precoder), a modulation and coding scheme (MCS), or a refined downlink beam (for example, using a beam refinement procedure or a beam management procedure), among other examples.

A DMRS may carry information used to estimate a radio channel for demodulation of an associated physical channel (for example, PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (for example, rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (for example, on the PDSCH) and uplink communications (for example, on the PUSCH).

A PRS may carry information used to enable timing or ranging measurements of the UE 120 based on signals transmitted by the network entity 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (for example, a PDCCH). In general, a PRS may be designed to improve detectability by the UE 120, which may need to detect downlink signals from multiple neighboring network entities in order to perform OTDOA-based positioning. Accordingly, the UE 120 may receive a PRS from multiple cells (for example, a reference cell and one or more neighbor cells), and may report a reference signal time difference (RSTD) based on OTDOA measurements associated with the PRSs received from the multiple cells. In some examples, the network entity 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 110 may measure the SRSs, may perform channel estimation based at least in part on the measurements, and may use the SRS measurements to configure communications with the UE 120.

Figure 5:
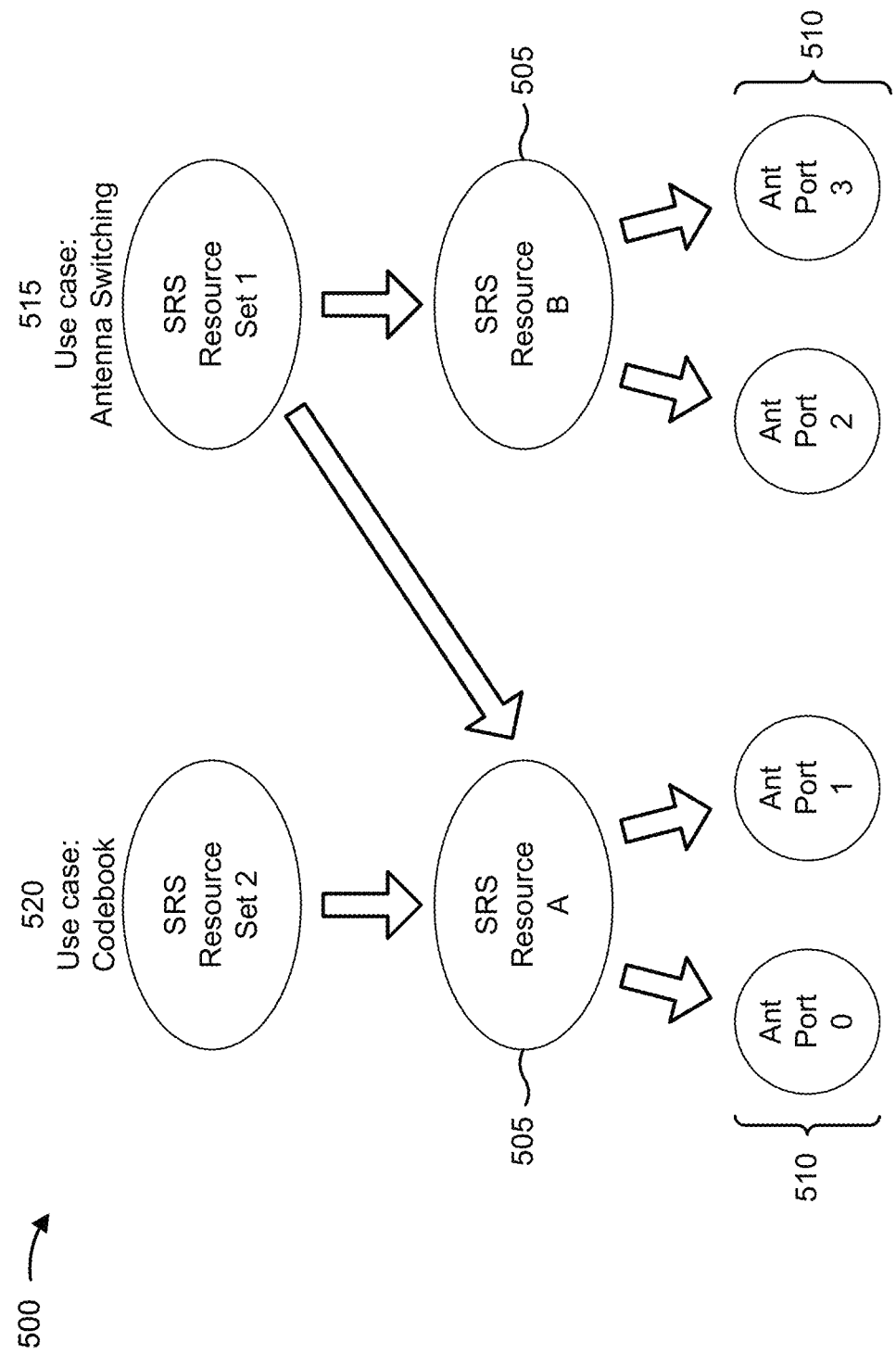
FIG. 5 is a diagram illustrating an example of sounding reference signal (SRS) resource sets, in accordance with the present disclosure.

FIG. 5 is a diagram illustrating an example of SRS resource sets 500, in accordance with the present disclosure. A network entity 110 may configure a UE 120 with one or more SRS resource sets to allocate resources for SRS transmissions by the UE 120. For example, a configuration for SRS resource sets may be indicated in a radio resource control (RRC) message (for example, an RRC configuration message or an RRC reconfiguration message). An SRS resource set may include one or more resources 505 (for example, shown as SRS resources), which may include time resources or frequency resources (for example, a slot, a symbol, a resource block, or a periodicity for the time resources).

An SRS resource may include one or more antenna ports 510 on which an SRS is to be transmitted (for example, in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some examples, the configuration for an SRS resource set may indicate a use case (for example, in an SRS-SetUse information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, a network entity 110 may use an antenna switching SRS (for example, an SRS transmitted using a resource of an antenna switching SRS resource set) to acquire downlink CSI (for example, to determine a downlink precoder to be used to communicate with the UE 120).

A codebook SRS resource set may be used to indicate uplink CSI when a network entity 110 indicates an uplink precoder to the UE 120. For example, when the network entity 110 is configured to indicate an uplink precoder to the UE 120 (for example, using a precoder codebook), the network entity 110 may use a codebook SRS (for example, an SRS transmitted using a resource of a codebook SRS resource set) to acquire uplink CSI (for example, to determine an uplink precoder to be indicated to the UE 120 and used by the UE 120 to communicate with the network entity 110). In some examples, virtual ports (for example, a combination of two or more antenna ports) with a maximum transmit power may be supported at least for a codebook SRS.

A non-codebook SRS resource set may be used to indicate uplink CSI when the UE 120 selects an uplink precoder (for example, instead of the network entity 110 indicated an uplink precoder to be used by the UE 120. For example, when the UE 120 is configured to select an uplink precoder, the network entity 110 may use a non-codebook SRS (for example, an SRS transmitted using a resource of a non-codebook SRS resource set) to acquire uplink CSI. In such examples, the non-codebook SRS may be precoded using a precoder selected by the UE 120 (for example, which may be indicated to the network entity 110). A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (for example, a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (for example, using DCI or a medium access control (MAC) control element (CE) (MAC-CE)). An aperiodic SRS resource may be triggered dynamically, such as via DCI (for example, UE-specific DCI or group common DCI) or a MAC-CE.

For example, an SRS configuration may indicate information for one or more SRS trigger states for aperiodic SRS resource sets. "SRS trigger state" may refer to a configuration for a list of one or more SRS resource sets to be triggered by DCI when the DCI indicates the specific SRS trigger state (for example, via an SRS request field in the DCI). Different SRS trigger states can be indicated or selected dynamically by a network entity 110. For example, the SRS configuration may map or link each SRS trigger state to a code point for a DCI field (for example, the SRS request field) or to another indicator. The network entity 110 may include the code point or indicator in DCI (for example, in an SRS request field) to dynamically trigger or select the SRS trigger state linked to or associated with an SRS resource set (or several SRS resource sets). In some examples, the SRS configuration may configure a linkage or association of different SRS trigger states to different SRS resource sets having different usage types, such as antenna switching, codebook, non-codebook, beam management, or positioning, among other examples.

In some examples, the UE 120 may be configured with a mapping between SRS ports (for example, antenna ports) and corresponding SRS resources. The UE 120 may transmit an SRS on a particular SRS resource using an SRS port indicated in the configuration. In some examples, an SRS resource may span N adjacent symbols within a slot (for example, where N equals 1, 2, or 4). The UE 120 may be configured with X SRS ports (for example, where X≤4). In some examples, each of the X SRS ports may mapped to a corresponding symbol of the SRS resource and used for transmission of an SRS in that symbol.

As shown in FIG. 5, in some examples, different SRS resource sets indicated to the UE 120 (for example, having different use cases) may overlap (for example, in time or in frequency, such as in the same slot). For example, a first SRS resource set 515 (for example, shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (for example, a first time-frequency resource) using antenna port 0 and antenna port 1 and may be transmitted in SRS Resource B (for example, a second time-frequency resource) using antenna port 2 and antenna port 3.

A second SRS resource set 520 (for example, shown as SRS Resource Set 2) may be a codebook use case. As shown, this example codebook SRS resource set includes only the first SRS resource (shown as SRS Resource A). Thus, codebook SRSs may be transmitted in SRS Resource A (for example, the first time-frequency resource) using antenna port 0 and antenna port 1. In such examples, the UE 120 may not transmit codebook SRSs in SRS Resource B (for example, the second time-frequency resource) using antenna port 2 and antenna port 3.

Although interference planning, group hopping, sequence hopping, or frequency hopping techniques may reduce or randomize some SRS interference at a receiver, SRSs may nonetheless still interfere with one another. For example, in coherent joint transmission (CJT) schemes, one or more UEs are coherently served by multiple TRPs or multiple network entities (for example, a cluster of TRPs), and thus the network may need information about channels between each TRP and a given UE in order to select transmission weights or other transmission parameters. Accordingly, each TRP of the multiple TRPs may need to receive SRS transmissions from a given UE, requiring the UE to transmit an SRS transmission with a large amount of power, thus increasing the likelihood of the SRS transmission reaching other network entities and causing interference. This may be particularly problematic when a large quantity of CJT UEs are near to one another, requiring multiple UEs to send SRS transmissions on the same OFDM symbols, thus increasing the likelihood of inter-cell or inter-cluster interference at the various receivers. In such scenarios, interference mitigation techniques performed by the UE 120 or the network entity 110 may insufficiently mitigate SRS interference, leading to degraded SRS reception and channel quality, and overall poor link performance including high latency, low throughput, or link failure.

In some examples, joint precoding (for example, zero-forcing beamforming), block-diagonal zero-forcing (BD-ZF) precoding, or null steering precoding, can be used to suppress multi-user interference. For example, multiple UEs may transmit SRSs using the same, or overlapping, resources (for example, time-frequency resources) and inter-UE interference may be mitigated by the network entity 110 based on performing the joint precoding techniques. As described above, in some cases, multiple TRPs may be associated with receiving an SRS transmitted by a UE 120, resulting in an increased transmission power associated with the SRS. The increased transmission power may result in an increased likelihood of interference within the wireless network. One technique to mitigate the interference may be to configure UEs to transmit SRSs less frequently in time (for example, sparser SRS transmissions). As another example, the network entity 110 may stagger SRS transmissions of different UEs in time so as to reduce the interference caused by the SRS transmissions.

However, as channel conditions change over time, the sparser periodicity of SRS transmissions may become insufficient for enabling the network entity 110 to perform accurate channel estimations. For example, a change in downlink traffic patterns or types or a change in scheduling decisions (such as multi-user grouping) can result in a change in SRS periodicity that is needed to enable accurate channel estimations for some UEs. For example, if more UEs are added to a group of UEs for MU-MIMO scheduling, more accurate channel estimation is needed as sensitivity to non-ideal precoding is increased. As a result, more frequent SRS transmissions may be needed for all UEs in the group. In other words, over time, to balance between interference mitigation (for example, associated with less frequent SRS transmissions or other adjusted SRS configuration parameters) and improved channel estimations (for example, associated with more frequent SRS transmissions or other adjusted SRS configuration parameters) a periodicity, a comb spacing, a comb offset, an SRS sequence, a cyclic shift, or other SRS configuration parameters may be changed (for example, by the network entity 110). For example, to ensure orthogonalization across SRS transmissions of different UEs, SRS parameters may need to be accurately assigned by the network entity 110 across multiple UEs.

However, updating or changing SRS configuration parameters may be associated with RRC signaling. For example, the network entity 110 may reconfigure one or more parameters associated with an SRS resource set via one or more RRC communications (for example, via an RRC reconfiguration communication). RRC signaling is associated with high latency and an RRC reconfiguration procedure may be non-synchronous. As a result, a UE may be configured with SRS configuration parameters for some time that result in interference or poor channel estimations (for example, performed by the network entity 110), leading to degraded SRS reception and channel quality, and overall poor link performance including high latency, low throughput, or link failure.

Various aspects relate generally to SRS resource set group switching. Some aspects more specifically relate to the network entity configuring multiple SRS resource set groups, where different groups include SRS resource sets associated with different SRS configuration parameters. For example, a first SRS resource set group may include one or more SRS resource sets associated with a first periodicity or a first slot offset, among other examples. A second SRS resource set group may include one or more SRS resource sets associated with a second periodicity or a second slot offset, among other examples. The network entity 110 may activate a given SRS resource set group at a given time and may be enabled to switch active SRS resource set groups over time. When an SRS resource set group is active, a UE 120 may transmit SRSs in accordance with the configuration of SRS resource sets included in the SRS resource set group. The UE 120 may refrain from transmitting SRSs associated with SRS resource sets that are not included in the active SRS resource set group.

For example, a UE 120 may receive configuration information, associated with a first SRS resource set, indicating that a first one or more groups of SRS resource sets, from multiple groups of SRS resource sets, are associated with the first SRS resource set. The UE 120 may receive an indication (for example, via a MAC-CE communication, a DCI communication, or an expiration of a timer, among other examples) that a first group, from the multiple groups, is activated for SRS transmissions, the first group being included in the first one or more groups that are associated with the first SRS resource set. The UE 120 may transmit an SRS using an SRS resource associated with the first SRS resource set based at least in part on the first group being activated and the first group being included in the first one or more groups. In some aspects, the UE 120 may refrain from transmitting SRSs using SRS resources associated with a second SRS resource set based at least in part on the first group being activated and the first group not being included in a second one or more groups that are associated with the second SRS resource set.

Particular aspects of the subject matter described in this disclosure can be implemented to realize one or more of the following potential advantages. In some examples, the described techniques can be used to enable the network entity 110 to quickly and dynamically adjust SRS configuration parameters associated with SRS transmissions by a UE 120. For example, by switching between different SRS resource set groups, the network entity 110 may cause the UE 120 to transmit SRSs with different periodicities, slot offsets, comb spacings, comb offsets, SRS sequences, cyclic shifts, or other SRS configuration parameters, over time without performing an RRC reconfiguration for an SRS resource set. This may reduce a latency associated with causing the UE 120 to transmit SRSs in accordance with different SRS configuration parameters. Additionally, this may reduce interference caused by SRS transmissions or improve channel estimations performed by the network entity 110, such as in CJT scenarios that include SRS transmissions to multiple network entities or multiple TRPs.

Figure 6:
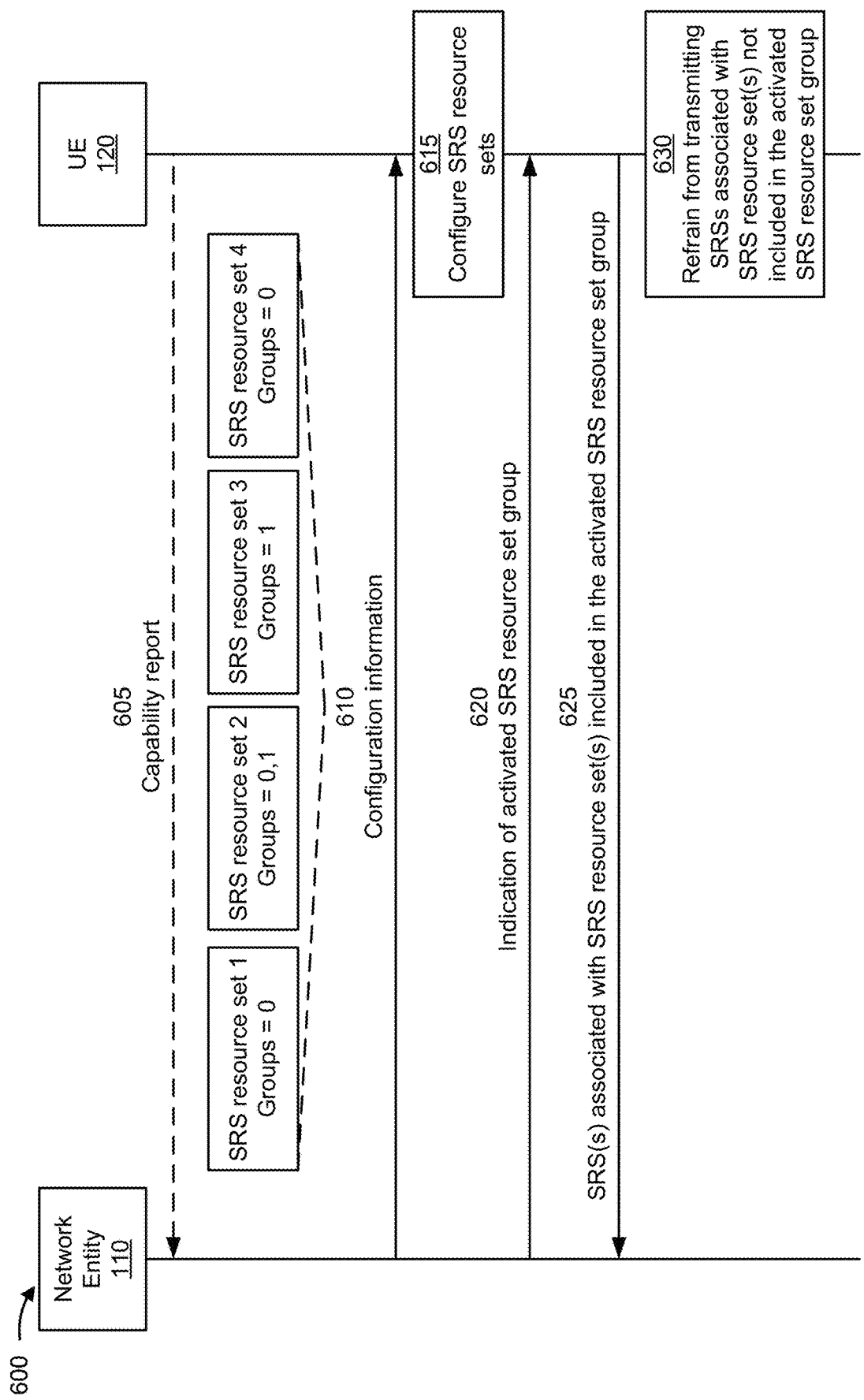
FIG. 6 is a diagram of an example associated with SRS resource set group switching, in accordance with the present disclosure.

FIG. 6 is a diagram of an example 600 associated with SRS resource set group switching, in accordance with the present disclosure. As shown in FIG. 6, a network entity (for example, the network entity 110) may communicate with a UE (for example, a UE 120). In some aspects, the network entity 110 and the UE 120 may be part of a wireless network (for example, the wireless network 100). The UE 120 and the network entity 110 may have established a wireless connection prior to operations shown in FIG. 6.

In some aspects, in a first operation 605, the UE 120 may transmit a capability report (for example, to the network entity 110 or to another network entity). The network entity 110 may receive the capability report associated with the UE 120 (for example, from the UE 120 or from another network entity). The capability report may indicate that the UE 120 supports being configured with one or more SRS resource set groups, as explained in more detail elsewhere herein. For example, the capability report may indicate that the UE 120 supports SRS resource set group switching, as explained in more detail elsewhere herein. The capability report may be transmitted via a PUCCH communication, a PUSCH communication, an uplink control information (UCI) communication, UE capability signaling, a UE assistance information (UAI) communication, or another type of communication. In some aspects, the network entity 110 may configure the UE 120 with two or more SRS resource set groups (for example, as explained in more detail elsewhere herein) based at least in part on the capability report indicating that the UE 120 supports SRS resource set group switching.

In a second operation 610, the network entity 110 may transmit configuration information (for example, to the UE 120 or to another network entity). The UE 120 may receive the configuration information (for example, from the network entity 110 or from another network entity). In some aspects, the UE 120 may receive the configuration information via one or more of RRC signaling, one or more MAC-CEs, or DCI, among other examples. In some aspects, the configuration information may include an indication of one or more configuration parameters (for example, already stored by the UE 120 or previously indicated by the network entity 110 or other network device) for selection by the UE 120, or explicit configuration information for the UE 120 to use to configure itself, among other examples.

In some aspects, the configuration information may include one or more SRS resource set configurations. The one or more SRS resource sets may be periodic SRS resource sets, semi-persistent SRS resource sets, or aperiodic SRS resource sets. For example, the network entity 110 may configure multiple SRS resource sets to be associated with the UE 120 (for example, in a similar manner as described above in connection with FIG. 5). The multiple SRS resource sets (or respective SRS resources included in the multiple SRS resource sets) may be associated with respective configuration parameters, such as a periodicity, a slot offset, a comb spacing, a comb offset, an SRS sequence, a cyclic shift, or other SRS configuration parameters (for example, as defined, or otherwise fixed, by a wireless communication standard, such as the 3GPP). Additionally, the configuration information may indicate, for each SRS resource set, one or more SRS resource set groups that the SRS resource set is included in. For example, a field or information element (IE) of an SRS resource set configuration (for example, in an SRS-config IE, an SRS-ResourceSet IE, or an SRS-Resource IE, among other examples) may indicate one or more SRS resource set groups associated with the SRS resource set.

In other words, the UE 120 may receive configuration information, associated with a first SRS resource set, indicating that a first one or more groups of SRS resource sets, from multiple groups of SRS resource sets, are associated with the first SRS resource set. The UE 120 may receive the configuration information, associated with a second SRS resource set, indicating that a second one or more groups, from the multiple groups, are associated with the second SRS resource set. For example, multiple SRS resource set groups can be defined (such as by the network entity 110), where each SRS resource set can be RRC configured with one or more SRS resource set groups. A given SRS resource set can belong to only one group, to more than one group, or to all groups.

For example, as shown in FIG. 6, the configuration information may indicate SRS resource set configurations for an SRS resource set 1, an SRS resource set 2, an SRS resource set 3, and an SRS resource set 4. As an example, the network entity 110 may define two SRS resource set groups (for example, a group 0 and a group 1). In other examples, the network entity 110 may define more than two SRS resource set groups, in a similar manner as described elsewhere herein. As shown in FIG. 6, the configuration information may indicate that the SRS resource set 1 is associated with (for example, included in) the SRS resource set group 0. The configuration information may indicate that the SRS resource set 2 is associated with (for example, included in) the SRS resource set group 0 and the SRS resource set group 1. The configuration information may indicate that the SRS resource set 3 is associated with (for example, included in) the SRS resource set group 1. The configuration information may indicate that the SRS resource set 4 is associated with (for example, included in) the SRS resource set group 0. Therefore, the SRS resource set group 0 may include the SRS resource set 1, the SRS resource set 2, and the SRS resource set 4. The SRS resource set group 1 may include the SRS resource set 2 and the SRS resource set 3.

As explained in more detail elsewhere herein, at a given time, only a single SRS resource set group may be activated. When an SRS resource set group is activated, the SRS resource sets included in, or associated with, the SRS resource set group may be applicable for transmission. All other configured SRS resource sets (for example, that are not included in, or associated with, the active SRS resource set group) may not be applicable for transmission. "Applicable for transmission" may refer to a scenario where the UE 120 may transmit SRSs using SRS resources included in the SRS resource set in accordance with the SRS resource set configuration, an activation of the SRS resource set (for example, for semi-persistent SRS resource sets), or a triggering of the SRS resource set (for example, for aperiodic SRS resource sets). In other words, if an SRS resource set is included in an activated SRS resource set group, then the UE 120 may proceed with transmitting SRSs associated with the SRS resource set group (for example, in accordance with the SRS resource set group configuration or other signaling from the network entity 110). If an SRS resource set is not included in the activated SRS resource set group, then the UE 120 may refrain from transmitting SRSs associated with the SRS resource set (for example, even if the SRS resource set configuration or other signaling from the network entity 110 indicates that the UE 120 is to transmit the SRSs). The "other signaling" from the network entity 110 may refer to a MAC-CE activation of a semi-persistent SRS resource set or a DCI triggering a transmission associated with an aperiodic SRS resource set, among other examples.

In some aspects, the configuration information may not indicate which SRS resource set group is associated with one or more SRS resource sets. For example, an SRS resource set may be configured without any SRS resource set groups. For example, an SRS resource set configuration may not indicate, or may not include a field associated with indicating, which SRS resource set groups are associated with the SRS resource set. For example, the UE 120 may receive configuration information, associated with a second SRS resource set, that does not indicate which groups, from the multiple groups, are associated with the second SRS resource set. In such examples, the second SRS resource set may be associated with all SRS resource set groups from the multiple SRS resource set groups defined by the network entity 110. For example, the UE 120 may assume that an SRS resource set that is not configured with any SRS resource set group is included in, or associated with, all SRS resource set groups (for example, is always applicable for transmission). As another example, the second SRS resource set may be associated with a default SRS resource set group. For example, the UE 120 may assume that an SRS resource set that is not configured with any SRS resource set group is included in, or associated with, a default SRS resource set group. As another example, the second SRS resource set may be associated with a first SRS resource group (for example, as indicated by index values of the multiple SRS resource set groups). For example, the UE 120 may assume that an SRS resource set that is not configured with any SRS resource set group is included in, or associated with, an SRS resource set group that is associated with a lowest (or highest) index value among index values of the multiple SRS resource set groups.

In some aspects, one SRS resource set group, from the multiple SRS resource set groups defined by the network entity 110, may be a default SRS resource set group. The "default" SRS resource set group may be the SRS resource set group that is active for the UE 120 after receiving the configuration information and prior to receiving an indication of another activated SRS resource set group, or may be an SRS resource set group that is activated for the UE 120 after an expiration of a timer, as explained in more detail elsewhere herein. In some aspects, the network entity 110 may indicate which SRS resource set group is the default group. As another example, the default group may be defined, or otherwise fixed, by a wireless communication standard, such as the 3GPP. For example, the UE 120 may identify the default group based at least in part on index values or identifiers associated with the configured SRS resource set groups. For example, the network entity 110 may indicate, or a wireless communication standard may define, that an SRS resource set group associated with a particular index value (for example, "0") is the default SRS resource set group.

In some aspects, a quantity of the multiple SRS resource set groups may be fixed (for example, may be defined by a wireless communication standard, such as the 3GPP). For example, the quantity of the multiple SRS resource set groups may be fixed at two. In other example, the quantity of the multiple SRS resource set groups may be determined by the network entity 110. In such examples, the quantity of the multiple SRS resource set groups may be two or may be greater than two. The network entity 110 may determine the quantity of the multiple SRS resource set groups based at least in part on a capability associated with the UE 120 (for example, as indicated by the UE 120 in the first operation 605). For example, the capability report may indicate a quantity of SRS resource set groups that is supported by the UE 120. In some aspects, the network entity 110 may transmit (for example, to the UE 120 or to another network entity) an RRC communication indicating a quantity of the multiple groups. The UE 120 may receive (for example, from the network entity 110 or from another network entity) an RRC communication indicating the quantity of the multiple groups.

In a third operation 615, the UE 120 may configure itself based at least in part on the configuration information. In some aspects, the UE 120 may be configured to perform one or more operations described herein based at least in part on the configuration information. For example, the UE 120 may configure the SRS resource sets indicated by the configuration information. In some aspects, the UE 120 may store configuration parameters associated with the SRS resource sets. In some aspects, the UE 120 may store an indication of one or more SRS resource set groups that are associated with a given SRS resource set (for example, as indicated by the configuration information).

In some aspects, in a fourth operation 620, the network entity 110 may transmit (for example, to the UE 120 or to another network entity) an indication of a first group, from the multiple SRS resource set groups configured by the network entity 110, that is activated for SRS transmissions. The UE 120 may receive (for example, from the network entity 110 or from another network entity) the indication of the first group that is activated for SRS transmissions by the UE 120. For example, the UE 120 may receive an indication that a first group, from the multiple groups, is activated for SRS transmissions, the first group being included in the first one or more groups that are associated with the first SRS resource set. The UE 120 may identify one or more SRS resource sets (for example, from the configuration information received in the second operation 610) that are associated with, or included in, the SRS resource set group indicated by the network entity 110 as being active. The UE 120 may identify one or more SRS resource sets (for example, from the configuration information received in the second operation 610) that are not associated with, or not included in, the SRS resource set group indicated by the network entity 110 as being active.

The UE 120 may identify whether the group indicated by the indication in the fourth operation 620 is different than a group that is currently active for the UE 120. If the group indicated by the network entity 110 (for example, a first group) is different than a group (for example, a second group) that is currently active for the UE 120, then the UE 120 may switch the active SRS resource set group for the UE 120 from the second group to the first group. For example, SRS resource set group switching may be based at least in part on an indication transmitted by the network entity 110 (for example, network indication based SRS resource set group switching). In other examples, SRS resource set group switching may be based at least in part on a timer (for example, timer based SRS resource set group switching), as explained in more detail elsewhere herein.

The UE 120 may switch, based at least in part on receiving the indication, from a second group, included in the multiple groups, to the first group in a next slot after an amount of time (for example, a switching time) from a last symbol associated with a communication that includes the indication. The switching time may be based at least in part on an amount of time associated with the UE 120 switching SRS resource sets that are applicable for transmission. The switching time may be based at least in part on a capability associated with the UE 120. Additionally or alternatively, the switching time may be defined, or otherwise fixed, by a wireless communication standard, such as the 3GPP. The switching time is depicted and described in more detail in connection with FIGS. 7 and 8.

In some aspects, the switching time may be measured from a time associated with a communication that includes the indication of the activated SRS resource set group (for example, as received as part of the fourth operation 620). For example, the switching time may be measured from a last symbol (for example, a last OFDM symbol) associated with the communication. In such examples, the communication may be a communication for which the UE 120 does not transmit hybrid automatic repeat request (HARD) feedback (for example, acknowledgment (ACK) or negative ACK (NACK) feedback) or another uplink signal in response to the communication. For example, the communication may be a broadcast communication or a group-common communication. In some aspects, the communication may be a downlink control information (DCI) communication. For example, the communication may be a group-common DCI communication, such as a DCI communication associated with DCI format 2_0 or DCI format 2_3, among other examples (for example, the DCI formats may be defined, or otherwise fixed, by a wireless communication standard, such as the 3GPP). For example, the UE 120 may switch to the first SRS resource set group (for example, the SRS resource set group indicated by a DCI communication) a switching time after a last symbol associated with the DCI communication. The switching time may be defined in terms of a quantity of symbols. As described elsewhere herein, the switching time may be RRC configured or based at least in part on a capability associated with the UE 120.

In some other aspects, the UE 120 may transmit HARQ feedback or another uplink signal in response to (or scheduled by) the communication. In such examples, the switching time may be measured from the HARQ feedback communication or the other uplink signal. For example, the UE 120 may transmit a HARQ feedback communication or another uplink communication associated with a communication that includes the indication of the activated SRS resource set group. The UE 120 may switch from a second group, included in the multiple groups, to the first group indicated by the communication in a next slot after an amount of time (for example, after the switching time) from a last symbol associated with the HARQ feedback communication or the other uplink communication. For example, the communication may be a DCI communication. For example, the DCI communication may be associated with a DCI format 1_1 or a DCI formation 1_2 (for example, with PDSCH scheduling or without PDSCH scheduling). As another example, the DCI communication may be associated with a DCI format 0_1 or a DCI formation 0_2 (for example, associated with scheduling a PUSCH communication or an aperiodic CSI communication). The switching time may be defined in terms of a quantity of symbols. As described elsewhere herein, the switching time may be RRC configured or based at least in part on a capability associated with the UE 120.

As another example, the communication may be a MAC-CE communication. In such examples, the UE 120 may switch to the group indicated by the MAC-CE communication an amount of time (for example, the switching time or an amount of time defined, or otherwise fixed, by the 3GPP, such as 3 milliseconds) after a last symbol of a HARQ feedback communication (for example, transmitted by the UE 120) that is in response to a PDSCH communication containing the MAC-CE.

As another example, SRS resource set group switching may be timer based. For example, a second group, from the multiple SRS resource set groups configured by the network entity 110, may be a default group (for example, as explained in more detail elsewhere herein). The communication, that is received by the UE 120 as part of the fourth operation 620, may indicate that a first group, from the multiple groups, is activated. In other words, the network entity may activate a non-default SRS resource set group. The UE 120 or the network entity 110 may switch to the first group (for example, the non-default SRS resource set group), such as in a similar manner as described in more detail elsewhere herein. The UE 120 may initiate a timer based at least in part on switching to the first group (for example, the non-default SRS resource set group). The UE 120 may switch from the first group to the second group (for example, to the default SRS resource set group) based at least in part on an expiration of the timer. For example, the UE 120 may switch to the default SRS resource set group in a next slot after the expiration of the timer. In some aspects, the UE 120 may switch to the default SRS resource set group in a next slot after an amount of time (for example, the switching time) from the expiration of the timer. For example, the UE 120 may switch to the default group in the first slot that is at least a switching time (in a unit of symbols) after the timer expires. A duration (for example, an amount of time) associated with the timer may be RRC configured, such as part of the second operation 610. In some aspects, the UE 120 may perform timer based SRS resource set group switching based at least in part on receiving a configuration indicating the duration of the timer (for example, the behavior is followed only when the duration of the timer is configured). An operation associated with timer based SRS resource set group switching is depicted and described in more detail in connection with FIG. 9.

In a fifth operation 625, the UE 120 may transmit one or more SRSs associated with SRS resource set(s) included in the activated SRS resource set group. For example, if a first SRS resource set group is activated (for example, as part of the fourth operation 620), the UE 120 may transmit an SRS using an SRS resource associated with the first SRS resource set based at least in part on the first SRS resource set group being activated and the first SRS resource set group being included in the first one or more SRS resource set groups that are associated with the first SRS resource set. If the first SRS resource set is a periodic SRS resource set, then the UE 120 may transmit the SRS in accordance with a periodicity associated with the periodic SRS resource set. If the first SRS resource set is a semi-persistent SRS resource set, then the UE 120 may transmit the SRS based at least in part on receiving a MAC-CE activating the semi-persistent SRS resource set. If the first SRS resource set is an aperiodic SRS resource set, then the UE 120 may transmit the SRS based at least in part on receiving DCI triggering or scheduling the SRS transmission. In other words, the UE 120 may transmit SRSs in accordance with configurations of SRS resource sets that are associated with, or included in, the activated SRS resource set group.

In a sixth operation 630, the UE 120 may refrain from transmitting one or more SRSs associated with SRS resource set(s) that are not included in the activated SRS resource set group. For example, the UE 120 may identify one or more SRS resource sets that are not associated with, or not included in, the activated SRS resource set group. For example, using the SRS resource sets shown in FIG. 6, if the SRS resource set group 1 is activated, the UE 120 may refrain from transmitting (for example, may not transmit) SRSs using SRS resources included in the SRS resource set 1 and the SRS resource set 4. For example, if the SRS resource set 1 is a periodic SRS resource set, a transmission timing for SRSs associated with the SRS resource set 1 may be indicated by a periodicity. Because the SRS resource set 1 is not included in the activated SRS resource set group, at a time at which the UE would otherwise transmit an SRS associated with the SRS resource set 1 (for example, as indicated by the periodicity associated with the SRS resource set 1), the UE 120 may refrain from transmitting (for example, may not transmit) the SRS associated with the SRS resource set 1. If the active SRS resource set group is switched to the SRS resource set group 0 (for example, via an indication from the network entity 110 or via an expiration of a timer, in a similar manner as described in more detail elsewhere herein), then the UE may transmit SRSs using SRS resources included in the SRS resource set 1, the SRS resource set 2, and the SRS resource set 4. In such examples, the UE 120 may refrain from transmitting (for example, may not transmit) SRSs using SRS resources included in the SRS resource set 3 (for example, based at least in part on the SRS resource set group 0 being activated and the SRS resource set 3 not being associated with, or included in, the SRS resource set group 0).

In some aspects, the techniques and operations described herein associated with SRS resource set group switching may only be applicable to periodic SRS resource sets (for example, and not semi-persistent SRS resource sets or aperiodic SRS resource sets). In some other aspects, the techniques and operations described herein associated with SRS resource set group switching may only be applicable to periodic SRS resource sets and semi-persistent SRS resource sets (for example, and not to aperiodic SRS resource set). In some other aspects, the techniques and operations described herein associated with SRS resource set group switching may be applicable to all SRS resource sets. For example, the UE 120 may transmit SRSs using SRS resources associated with semi-persistent SRS resource sets and aperiodic SRS resource sets regardless of the activated SRS resource set group. In other words, the UE 120 may consider semi-persistent SRS resource sets to be associated with all SRS resource set groups (for example, such that the semi-persistent SRS resource sets are always applicable for transmission). Additionally or alternatively, the UE 120 may consider aperiodic SRS resource sets to be associated with all SRS resource set groups (for example, such that the aperiodic SRS resource sets are always applicable for transmission).

For example, in some aspects, the techniques and operations described herein associated with SRS resource set group switching may be applicable to semi-persistent SRS resource sets. In such examples, the UE 120 may receive a MAC-CE communication activating the semi-persistent SRS resource set. The UE 120 may determine whether the semi-persistent SRS resource set is included in, or associated with, an SRS resource set group that is currently active. If the semi-persistent SRS resource set is included in, or associated with, an SRS resource set group that is currently active, then the UE 120 may transmit one or more SRSs using SRS resources included in the semi-persistent SRS resource set (for example, as part of the fifth operation 625). In other words, transmitting the one or more SRSs may be based at least in part on the SRS resource set group being activated and receiving the MAC-CE communication activating the semi-persistent SRS resource set. If the semi-persistent SRS resource set is not included in, or not associated with, an SRS resource set group that is currently active, then the UE 120 may refrain from transmitting SRSs using SRS resources included in the semi-persistent SRS resource set (for example, as part of the sixth operation 630). For example, the UE 120 may refrain from transmitting SRSs using SRS resources associated with the semi-persistent SRS resource set based at least in part on the SRS resource set group being activated and the SRS resource set group not being included in one or more groups associated with the semi-persistent SRS resource set. In other words, even if the semi-persistent SRS resource set is activated (for example, by a MAC-CE), the UE 120 may not transmit SRSs associated with the semi-persistent SRS resource set if the semi-persistent SRS resource set is not included in, or associated with, a currently active SRS resource set group.

As another example, the techniques and operations described herein associated with SRS resource set group switching may be applicable to aperiodic SRS resource sets. For example, the UE 120 may receive DCI triggering an SRS transmission via one or more aperiodic SRS resource sets (for example, via a value indicated in an SRS request field of the DCI, as explained in more detail elsewhere herein). In some aspects, the UE 120 may transmit (for example, as part of the fifth operation 625) via SRS resources included in SRS resource sets that are mapped to the indicated SRS request field codepoint of the triggering DCI (by an RRC configuration such as an aperiodicSRS-Resource Trigger IE or an aperiodicSRS-ResourceTrigger-List IE). As another example, the UE 120 may transmit (for example, as part of the fifth operation 625) via SRS resources included in SRS resource sets that are mapped to the indicated SRS request field codepoint of the triggering DCI and that are associated with, or included in, a currently active SRS resource set group. For example, a value indicated in the SRS request field of the DCI may indicate that a first SRS resource set (for example, the SRS resource set 1) and a second SRS resource set (for example, the SRS resource set 2) are triggered. A first SRS resource set group (for example, the SRS resource set group 1) may be currently active. The first SRS resource set (for example, the SRS resource set 1) may not be included in, or not associated with, the first SRS resource set group. The second SRS resource set (for example, the SRS resource set 2) may be included in, or associated with, the first SRS resource set group. Therefore, the UE 120 may transmit (for example, as part of the fifth operation 625) one or more SRSs using SRS resources included in the second SRS resource set (for example, the SRS resource set 2) based at least in part on receiving the DCI triggering the second SRS resource set and on the second SRS resource set being associated with the first SRS resource set group. The UE 120 may refrain from transmitting (for example, as part of the sixth operation 630) SRSs using SRS resources included in the first SRS resource set (for example, the SRS resource set 1) based at least in part on the first SRS resource set not being associated with, or not included in, the currently active SRS resource set group (for example, even though the first SRS resource set has been triggered by the DCI).

As a result, the network entity 110 may be enabled to quickly and dynamically adjust SRS configuration parameters associated with SRS transmissions by a UE 120. For example, by switching between different SRS resource set groups, the network entity 110 may cause the UE 120 to transmit SRSs with different periodicities, slot offsets, comb spacings, comb offsets, SRS sequences, cyclic shifts, or other SRS configuration parameters, over time, without performing an RRC reconfiguration for an SRS resource set. This may reduce a latency associated with causing the UE 120 to transmit SRSs in accordance with different SRS configuration parameters. Additionally, this may reduce interference caused by SRS transmissions or improve channel estimations performed by the network entity 110, such as in CJT scenarios that include SRS transmissions to multiple network entities or multiple TRPs.

Figure 7:
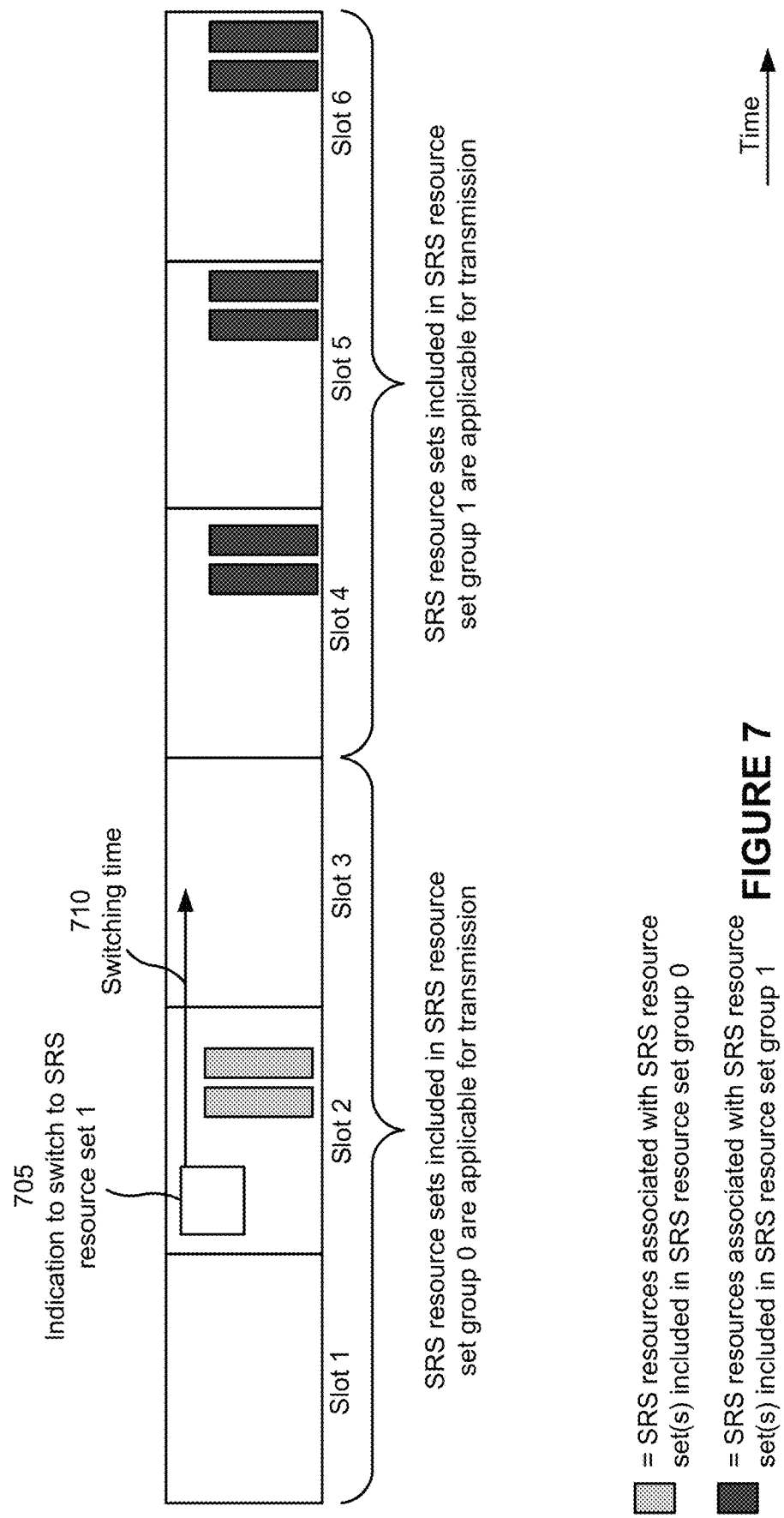
FIG. 7 is a diagram of an example associated with network indicated SRS resource set group switching, in accordance with the present disclosure.

FIG. 7 is a diagram of an example associated with network indicated SRS resource set group switching 700, in accordance with the present disclosure. The network indicated SRS resource set group switching 700 may be associated with a scenario in which a communication indicating an active SRS resource set group is not associated with a HARQ feedback communication or another uplink communication transmitted by a UE 120 (for example, the UE 120 depicted and described in connection with FIG. 6) in response to the communication. FIG. 7 depicts a timeline associated with the network indicated SRS resource set group switching 700. As shown in FIG. 7, the network indicated SRS resource set group switching 700 may occur over a set of slots. In some other aspects, a transmission time interval (TTI) other than slots may be used, such as mini-slots or symbols, among other examples.

For example, the UE 120 may receive an indication 705 to switch to an SRS resource set group 1 (for example, in a similar manner as in the fourth operation 620). The indication 705 may be included in a communication, such as a DCI communication or another communication. The communication may not be associated with HARQ feedback or another uplink communication to be transmitted by a UE 120 in response to the communication. As shown in FIG. 7, a switching time 710 may be based at least in part on a timing of the communication that includes the indication 705. For example, the switching time 710 (for example, a quantity of OFDM symbols, as explained in more detail elsewhere herein) may start after a last OFDM symbol associated with the communication. For example, as shown in FIG. 7, the communication may be received by the UE 120 in a slot 2. The switching time may start after a last OFDM symbol associated with the communication and end in an OFDM symbol that is included in a slot 3.

As shown in FIG. 7, at a time when the indication 705 is received by the UE 120, SRS resource sets included in an SRS resource set group 0 may be applicable for transmission. In other words, at a time when the indication 705 (for example, indicating that the SRS resource set group 1 is to be active) is received by the UE 120, the SRS resource set group 0 may be an active SRS resource set group. Therefore, the UE 120 may switch from the SRS resource set group 0 to the SRS resource set group 1. A timing of the switch may be based at least in part on the switching time 710. For example, the UE 120 may switch from the SRS resource set group 0 to the SRS resource set group 1 in a next slot after the expiration of the switching time 710. For example, as shown in FIG. 7, the switching time 710 may end in the slot 3. Therefore, starting in the slot 4 (for example, the next slot after the slot 3 in the time domain), the SRS resource set group 1 may be the active SRS resource set group. For example, starting in slot 4 SRS resource sets included in the SRS resource set group 1 may be applicable for transmission. The timing of the switch may enable the UE 120 and a network entity 110 to be synchronized as to which SRS resource sets are applicable for transmission at a given time.

Figure 8:
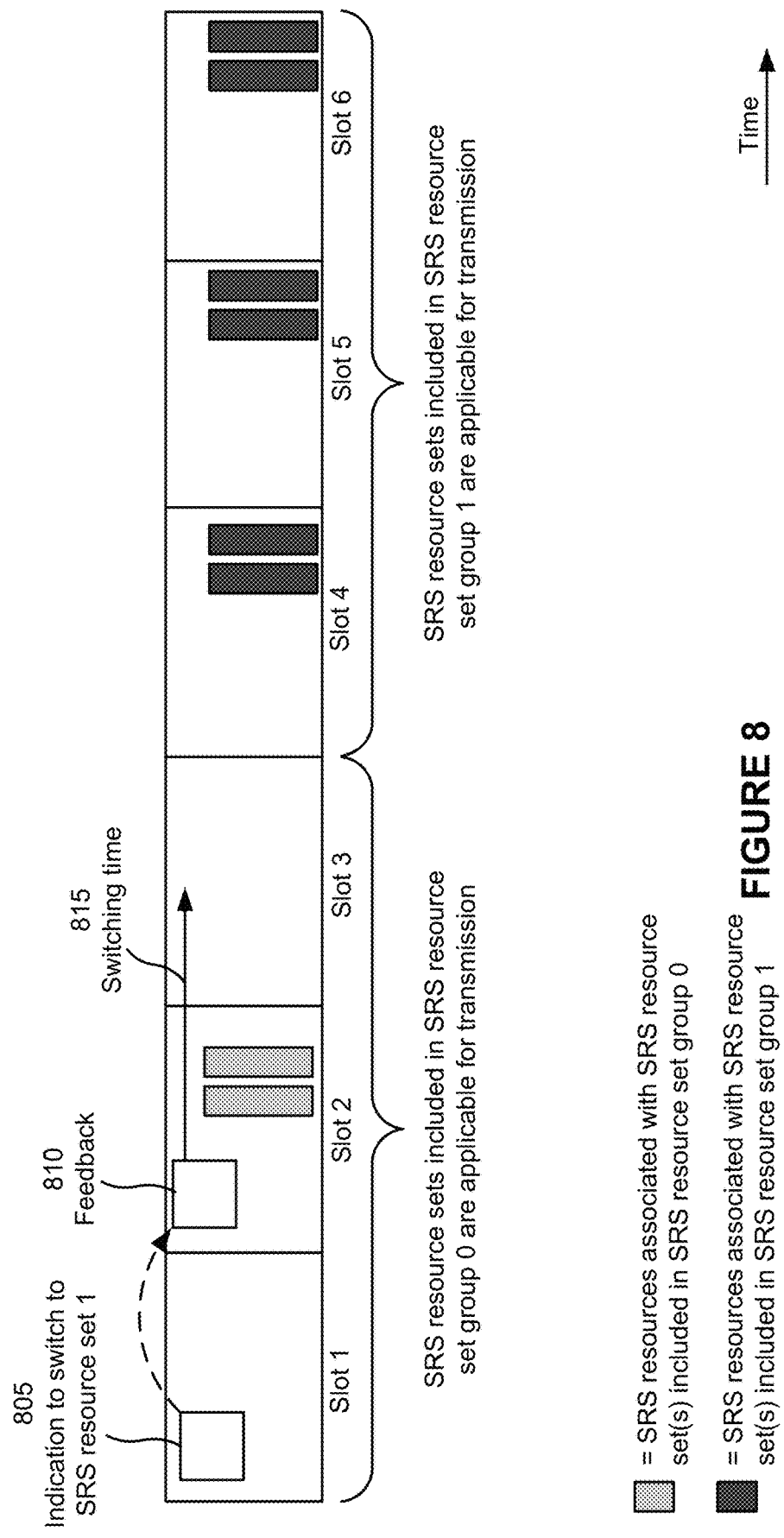
FIG. 8 is a diagram of an example associated with network indicated SRS resource set group switching, in accordance with the present disclosure.

FIG. 8 is a diagram of an example associated with network indicated SRS resource set group switching 800, in accordance with the present disclosure. The network indicated SRS resource set group switching 800 may be associated with a scenario in which a communication indicating an active SRS resource set group is associated with a HARQ feedback communication or another uplink communication to be transmitted by a UE 120 (for example, the UE 120 depicted and described in connection with FIG. 6 or 7) in response to the communication. FIG. 8 depicts a timeline associated with the network indicated SRS resource set group switching 800. As shown in FIG. 8, the network indicated SRS resource set group switching 800 may occur over a set of slots. In some other aspects, a TTI other than slots may be used, such as mini-slots or symbols, among other examples.

For example, the UE 120 may receive an indication 805 to switch to an SRS resource set group 1 (for example, in a similar manner as in the fourth operation 620). The indication 805 may be included in a communication, such as a DCI communication, a MAC-CE, or another communication. The communication may be associated with HARQ feedback 810 or another uplink communication to be transmitted by a UE 120 in response to the communication. For example, the UE 120 may transmit the HARQ feedback 810 indicating whether the communication that includes the indication 805 was successfully received or decoded by the UE 120. As shown in FIG. 8, a switching time 815 may be based at least in part on a timing of the communication that includes the HARQ feedback 810. For example, the switching time 815 (for example, a quantity of OFDM symbols, as explained in more detail elsewhere herein) may start after a last OFDM symbol associated with the communication that includes the HARQ feedback 810. For example, as shown in FIG. 8, the communication that includes the HARQ feedback 810 may be transmitted by the UE 120 in a slot 2. The switching time 815 may start after a last OFDM symbol associated with the communication that includes the HARQ feedback 810 and end in an OFDM symbol that is included in a slot 3.

As shown in FIG. 8, at a time when the indication 805 is received by the UE 120, SRS resource sets included in an SRS resource set group 0 may be applicable for transmission. In other words, at a time when the indication 805 (for example, indicating that the SRS resource set group 1 is to be active) is received by the UE 120, the SRS resource set group 0 may be an active SRS resource set group. Therefore, the UE 120 may switch from the SRS resource set group 0 to the SRS resource set group 1. A timing of the switch may be based at least in part on the switching time 815. For example, the UE 120 may switch from the SRS resource set group 0 to the SRS resource set group 1 in a next slot after the expiration of the switching time 815. For example, as shown in FIG. 8, the switching time 815 may end in the slot 3. Therefore, starting in the slot 4 (for example, the next slot after the slot 3 in the time domain), the SRS resource set group 1 may be the active SRS resource set group. For example, starting in slot 4 SRS resource sets included in the SRS resource set group 1 may be applicable for transmission. The timing of the switch may enable the UE 120 and a network entity 110 to be synchronized as to which SRS resource sets are applicable for transmission at a given time.

Figure 9:
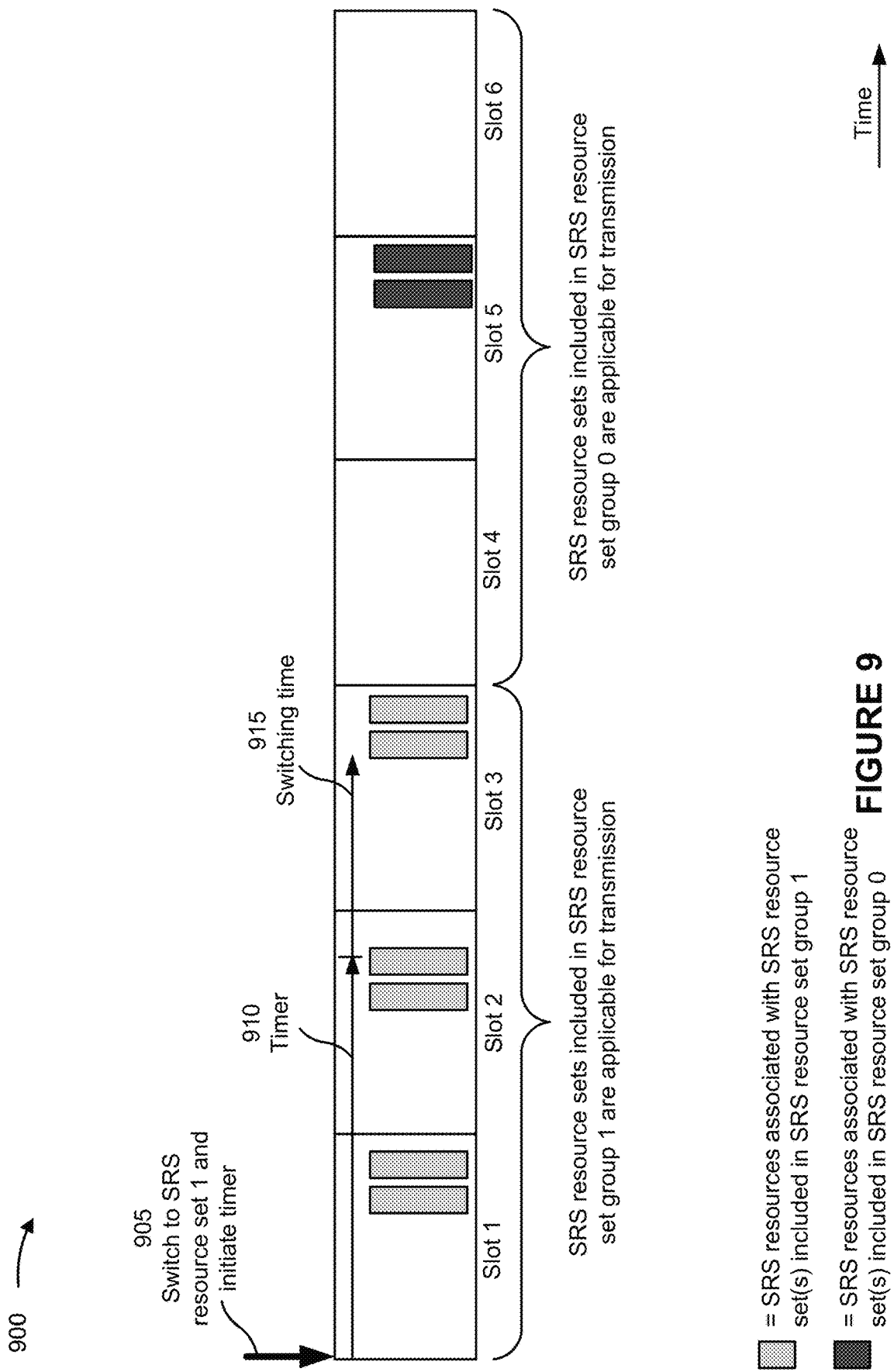
FIG. 9 is a diagram of an example associated with timer based SRS resource set group switching, in accordance with the present disclosure.

FIG. 9 is a diagram of an example associated with timer based SRS resource set group switching 900, in accordance with the present disclosure. The timer based SRS resource set group switching 900 may be associated with a scenario in which a UE 120 (for example, the UE 120 depicted and described in connection with FIG. 6, 7, or 8) switches to an SRS resource set group based at least in part on an expiration of a timer. FIG. 9 depicts a timeline associated with the timer based SRS resource set group switching 900. As shown in FIG. 9, the timer based SRS resource set group switching 900 may occur over a set of slots. In some other aspects, a TTI other than slots may be used, such as mini-slots or symbols, among other examples.

In a first operation 905, the UE 120 may switch to an SRS resource set 1. The SRS resource set 1 may not be a default SRS resource set group (for example, as described in more detail elsewhere herein). For example, an SRS resource set 0 may be the default SRS resource set group. As part of the first operation 905, the UE 120 may initiate a timer 910. For example, based at least in part on switching to a non-default SRS resource set group, the UE 120 may initiate the timer 910. The timer 910 may be associated with a duration (for example, an amount of time). The duration may be RRC configured or may be defined, or otherwise fixed, by a wireless communication standard, such as the 3GPP. For example, as shown in FIG. 9, the UE 120 may initiate the timer 910 at the start of a slot 1 (for example, when the UE 120 switches to the SRS resource set 1, such as based on a network indicated SRS resource set switch, as described in more detail in connection with FIGS. 6, 7, and 8). The duration of the timer 910 may indicate that the timer 910 is to expire at a point in time during a slot 2.

The UE 120 may switch to the default SRS resource set group (for example, the SRS resource set group 0) based at least in part on an expiration of the timer 910. A timing of the switch to the default SRS resource set group may be based at least in part on a switching time 915. As shown in FIG. 9, the switching time 915 (for example, a switching time as described in more detail elsewhere herein) may be based at least in part on an expiration of the timer 910. For example, the switching time 915 may begin at an OFDM symbol that is associated with the expiration of the timer. As shown in FIG. 9, the UE 120 may switch from the SRS resource set group 1 (the non-default SRS resource set group) to the SRS resource set group 0 (the default SRS resource set group) in a next slot after the expiration of the switching time 915. For example, as shown in FIG. 9, the switching time 915 may end in the slot 3. Therefore, starting in the slot 4 (for example, the next slot after the slot 3 in the time domain), the SRS resource set group 0 may be the active SRS resource set group. For example, starting in slot 4 SRS resource sets included in the SRS resource set group 0 may be applicable for transmission. The timing of the switch may enable the UE 120 and a network entity 110 to be synchronized as to which SRS resource sets are applicable for transmission at a given time.

Figure 10:
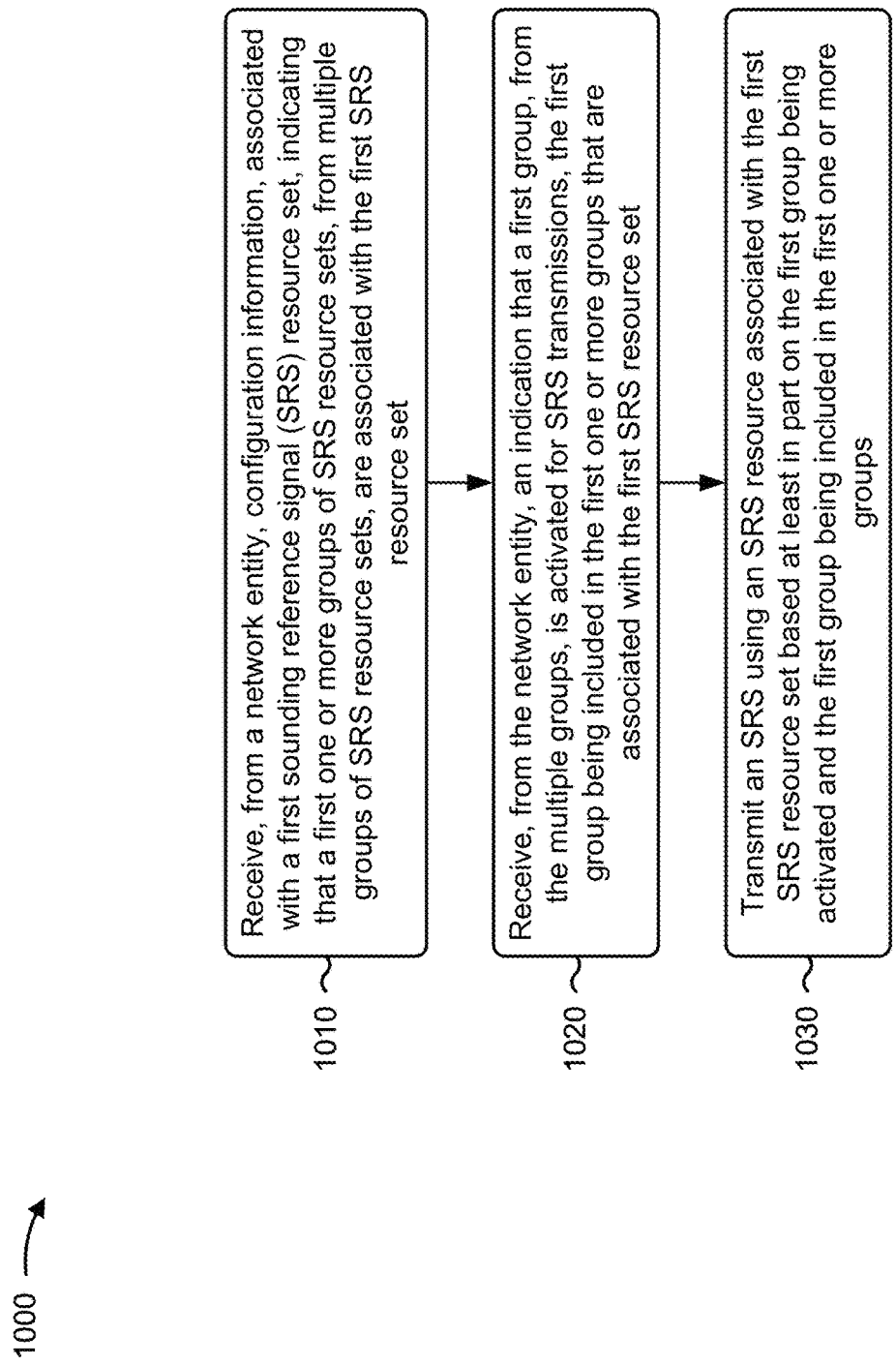
FIG. 10 is a flowchart illustrating an example process performed, for example, by a UE, associated with SRS resource set group switching, in accordance with the present disclosure.

FIG. 10 is a flowchart illustrating an example process 1000 performed, for example, by a UE, associated with SRS resource set group switching, in accordance with the present disclosure. Example process 1000 is an example where the UE (for example, the UE 120) performs operations associated with SRS resource set group switching.

As shown in FIG. 10, in some aspects, process 1000 may include receiving, from a network entity, configuration information, associated with a first SRS resource set, indicating that a first one or more groups of SRS resource sets, from multiple groups of SRS resource sets, are associated with the first SRS resource set (block 1010). For example, the UE (such as by using communication manager 140 or reception component 1202, depicted in FIG. 12) may receive, from a network entity, configuration information, associated with a first SRS resource set, indicating that a first one or more groups of SRS resource sets, from multiple groups of SRS resource sets, are associated with the first SRS resource set, as described above.

As further shown in FIG. 10, in some aspects, process 1000 may include receiving, from the network entity, an indication that a first group, from the multiple groups, is activated for SRS transmissions, the first group being included in the first one or more groups that are associated with the first SRS resource set (block 1020). For example, the UE (such as by using communication manager 140 or reception component 1202, depicted in FIG. 12) may receive, from the network entity, an indication that a first group, from the multiple groups, is activated for SRS transmissions, the first group being included in the first one or more groups that are associated with the first SRS resource set, as described above.

As further shown in FIG. 10, in some aspects, process 1000 may include transmitting an SRS using an SRS resource associated with the first SRS resource set based at least in part on the first group being activated and the first group being included in the first one or more groups (block 1030). For example, the UE (such as by using communication manager 140 or transmission component 1204, depicted in FIG. 12) may transmit an SRS using an SRS resource associated with the first SRS resource set based at least in part on the first group being activated and the first group being included in the first one or more groups, as described above.

Process 1000 may include additional aspects, such as any single aspect or any combination of aspects described below or in connection with one or more other processes described elsewhere herein.

In a first additional aspect, process 1000 includes receiving configuration information, associated with a second SRS resource set, indicating that a second one or more groups, from the multiple groups, are associated with the second SRS resource set, and refraining from transmitting SRSs using SRS resources associated with the second SRS resource set based at least in part on the first group being activated and the first group not being included in the second one or more groups.

In a second additional aspect, alone or in combination with the first aspect, process 1000 includes receiving configuration information, associated with a second SRS resource set, that does not indicate which groups, from the multiple groups, are associated with the second SRS resource set.

In a third additional aspect, alone or in combination with one or more of the first and second aspects, the second SRS resource set is associated with all groups from the multiple groups.

In a fourth additional aspect, alone or in combination with one or more of the first through third aspects, the second SRS resource set is associated with the first group from the multiple groups, where the first group is a default group.

In a fifth additional aspect, alone or in combination with one or more of the first through fourth aspects, process 1000 includes receiving an RRC communication indicating a quantity of the multiple groups.

In a sixth additional aspect, alone or in combination with one or more of the first through fifth aspects, a quantity of the multiple groups is based at least in part on a capability associated with the UE.

In a seventh additional aspect, alone or in combination with one or more of the first through sixth aspects, process 1000 includes switching, based at least in part on receiving the indication, from a second group, included in the multiple groups, to the first group in a next slot after an amount of time from a last symbol associated with a communication that includes the indication.

In an eighth additional aspect, alone or in combination with one or more of the first through seventh aspects, the communication is a DCI communication, and the UE does not transmit HARQ feedback associated with the communication.

In a ninth additional aspect, alone or in combination with one or more of the first through eighth aspects, process 1000 includes transmitting, to the network entity, a HARQ feedback communication associated with a communication that includes the indication, and switching, based at least in part on receiving the indication, from a second group, included in the multiple groups, to the first group in a next slot after an amount of time from a last symbol associated with the HARQ feedback communication.

In a tenth additional aspect, alone or in combination with one or more of the first through ninth aspects, the communication is a DCI communication or a MAC-CE communication.

In an eleventh additional aspect, alone or in combination with one or more of the first through tenth aspects, a second group, included in the multiple groups, is a default group, and process 1000 includes initiating a timer based at least in part on switching to the first group, and switching from the first group to the second group based at least in part on an expiration of the timer.

In a twelfth additional aspect, alone or in combination with one or more of the first through eleventh aspects, process 1000 includes receiving an RRC communication indicating an amount of time associated with the timer.

In a thirteenth additional aspect, alone or in combination with one or more of the first through twelfth aspects, switching from the first group to the second group includes switching from the first group to the second group in a next slot after an amount of time from the expiration of the timer.

In a fourteenth additional aspect, alone or in combination with one or more of the first through thirteenth aspects, the first SRS resource set is a semi-persistent SRS resource set or an aperiodic SRS resource set, and the first one or more groups include all groups included in the multiple groups.

In a fifteenth additional aspect, alone or in combination with one or more of the first through fourteenth aspects, the first SRS resource set is a semi-persistent SRS resource set, and process 1000 includes receiving, from the network entity, a MAC-CE communication activating the first SRS resource set, where transmitting the SRS is based at least in part on the first group being activated and receiving the MAC-CE communication.

In a sixteenth additional aspect, alone or in combination with one or more of the first through fifteenth aspects, process 1000 includes receiving, from the network entity, a MAC-CE communication activating a second SRS resource set, where the second SRS resource set is a semi-persistent SRS resource set, and where the second SRS resource set is associated with a second one or more groups from the multiple groups, and refraining from transmitting SRSs using SRS resources associated with the second SRS resource set based at least in part on the first group being activated and the first group not being included in the second one or more groups.

In a seventeenth additional aspect, alone or in combination with one or more of the first through sixteenth aspects, the first SRS resource set is an aperiodic SRS resource set, and process 1000 includes receiving, from the network entity, a DCI communication triggering a transmission via the first SRS resource set, where transmitting the SRS is based at least in part on the first group being activated and on receiving the DCI communication.

In an eighteenth additional aspect, alone or in combination with one or more of the first through seventeenth aspects, process 1000 includes receiving, from the network entity, a DCI communication triggering a transmission via a second SRS resource set, where the second SRS resource set is associated with a second one or more groups from the multiple groups, and refraining from transmitting SRSs using SRS resources associated with the second SRS resource set based at least in part on the first group being activated and the first group not being included in the second one or more groups.

In a nineteenth additional aspect, alone or in combination with one or more of the first through eighteenth aspects, the indication is included in at least one of DCI or a MAC-CE.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
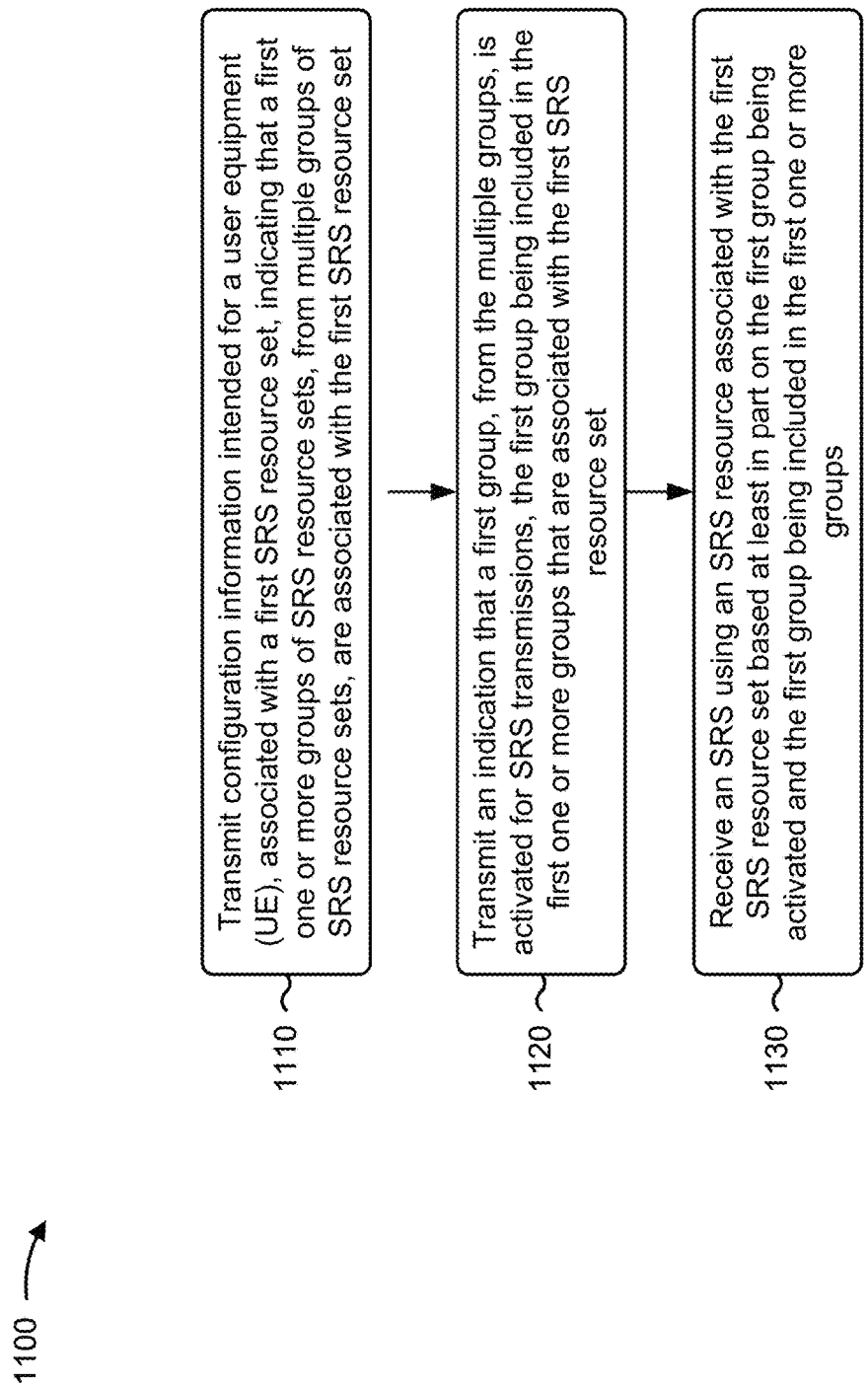
FIG. 11 is a flowchart illustrating an example process performed, for example, by a network entity, associated with SRS resource set group switching, in accordance with the present disclosure.

FIG. 11 is a flowchart illustrating an example process 1100 performed, for example, by a network entity, associated with SRS resource set group switching, in accordance with the present disclosure. Example process 1100 is an example where the network entity (for example, the network entity 110) performs operations associated with SRS resource set group switching.

As shown in FIG. 11, in some aspects, process 1100 may include transmitting configuration information intended for a UE, associated with a first SRS resource set, indicating that a first one or more groups of SRS resource sets, from multiple groups of SRS resource sets, are associated with the first SRS resource set (block 1110). For example, the network entity (such as by using communication manager 150 or transmission component 1304, depicted in FIG. 13) may transmit configuration information intended for a UE, associated with a first SRS resource set, indicating that a first one or more groups of SRS resource sets, from multiple groups of SRS resource sets, are associated with the first SRS resource set, as described above.

As further shown in FIG. 11, in some aspects, process 1100 may include transmitting an indication that a first group, from the multiple groups, is activated for SRS transmissions, the first group being included in the first one or more groups that are associated with the first SRS resource set (block 1120). For example, the network entity (such as by using communication manager 150 or transmission component 1304, depicted in FIG. 13) may transmit an indication that a first group, from the multiple groups, is activated for SRS transmissions, the first group being included in the first one or more groups that are associated with the first SRS resource set, as described above.

As further shown in FIG. 11, in some aspects, process 1100 may include receiving an SRS using an SRS resource associated with the first SRS resource set based at least in part on the first group being activated and the first group being included in the first one or more groups (block 1130). For example, the network entity (such as by using communication manager 150 or reception component 1302, depicted in FIG. 13) may receive an SRS using an SRS resource associated with the first SRS resource set based at least in part on the first group being activated and the first group being included in the first one or more groups, as described above.

Process 1100 may include additional aspects, such as any single aspect or any combination of aspects described below or in connection with one or more other processes described elsewhere herein.

In a first additional aspect, process 1100 includes transmitting configuration information, associated with a second SRS resource set, indicating that a second one or more groups, from the multiple groups, are associated with the second SRS resource set, and refraining from receiving SRSs using SRS resources associated with the second SRS resource set based at least in part on the first group being activated and the first group not being included in the second one or more groups.

In a second additional aspect, alone or in combination with the first aspect, process 1100 includes transmitting configuration information, associated with a second SRS resource set, that does not indicate which groups, from the multiple groups, are associated with the second SRS resource set.

In a third additional aspect, alone or in combination with one or more of the first and second aspects, the second SRS resource set is associated with all groups from the multiple groups.

In a fourth additional aspect, alone or in combination with one or more of the first through third aspects, the second SRS resource set is associated with the first group from the multiple groups, where the first group is a default group.

In a fifth additional aspect, alone or in combination with one or more of the first through fourth aspects, process 1100 includes transmitting an RRC communication indicating a quantity of the multiple groups.

In a sixth additional aspect, alone or in combination with one or more of the first through fifth aspects, a quantity of the multiple groups is based at least in part on a capability associated with the UE.

In a seventh additional aspect, alone or in combination with one or more of the first through sixth aspects, process 1100 includes switching, based at least in part on transmitting the indication, from a second group, included in the multiple groups, to the first group in a next slot after an amount of time from a last symbol associated with a communication that includes the indication.

In an eighth additional aspect, alone or in combination with one or more of the first through seventh aspects, the communication is a DCI communication, and the network entity does not receive HARQ feedback associated with the communication.

In a ninth additional aspect, alone or in combination with one or more of the first through eighth aspects, process 1100 includes receiving a HARQ feedback communication associated with a communication that includes the indication, and switching, based at least in part on transmitting the indication, from a second group, included in the multiple groups, to the first group in a next slot after an amount of time from a last symbol associated with the HARQ feedback communication.

In a tenth additional aspect, alone or in combination with one or more of the first through ninth aspects, the communication is a DCI communication or a MAC-CE communication.

In an eleventh additional aspect, alone or in combination with one or more of the first through tenth aspects, a second group, included in the multiple groups, is a default group, and process 1100 includes initiating a timer based at least in part on transmitting the indication, and switching from the first group to the second group based at least in part on an expiration of the timer.

In a twelfth additional aspect, alone or in combination with one or more of the first through eleventh aspects, process 1100 includes transmitting an RRC communication indicating an amount of time associated with the timer.

In a thirteenth additional aspect, alone or in combination with one or more of the first through twelfth aspects, switching from the first group to the second group includes switching from the first group to the second group in a next slot after an amount of time from the expiration of the timer.

In a fourteenth additional aspect, alone or in combination with one or more of the first through thirteenth aspects, the first SRS resource set is a semi-persistent SRS resource set or an aperiodic SRS resource set, and where the first one or more groups include all groups included in the multiple groups.

In a fifteenth additional aspect, alone or in combination with one or more of the first through fourteenth aspects, the first SRS resource set is a semi-persistent SRS resource set, and process 1100 includes transmitting a MAC-CE communication activating the first SRS resource set, where receiving the SRS is based at least in part on the first group being activated and transmitting the MAC-CE communication.

In a sixteenth additional aspect, alone or in combination with one or more of the first through fifteenth aspects, process 1100 includes transmitting a MAC-CE communication activating a second SRS resource set, where the second SRS resource set is a semi-persistent SRS resource set, and where the second SRS resource set is associated with a second one or more groups from the multiple groups, and refraining from receiving SRSs using SRS resources associated with the second SRS resource set based at least in part on the first group being activated and the first group not being included in the second one or more groups.

In a seventeenth additional aspect, alone or in combination with one or more of the first through sixteenth aspects, the first SRS resource set is an aperiodic SRS resource set, and process 1100 includes transmitting a DCI communication triggering a transmission by the UE via the first SRS resource set, where transmitting the SRS is based at least in part on the first group being activated and on transmitting the DCI communication.

In an eighteenth additional aspect, alone or in combination with one or more of the first through seventeenth aspects, process 1100 includes transmitting a DCI communication triggering a transmission via a second SRS resource set, where the second SRS resource set is associated with a second one or more groups from the multiple groups, and refraining from receiving SRSs using SRS resources associated with the second SRS resource set based at least in part on the first group being activated and the first group not being included in the second one or more groups.

In a nineteenth additional aspect, alone or in combination with one or more of the first through eighteenth aspects, the indication is included in at least one of DCI or a MAC-CE.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
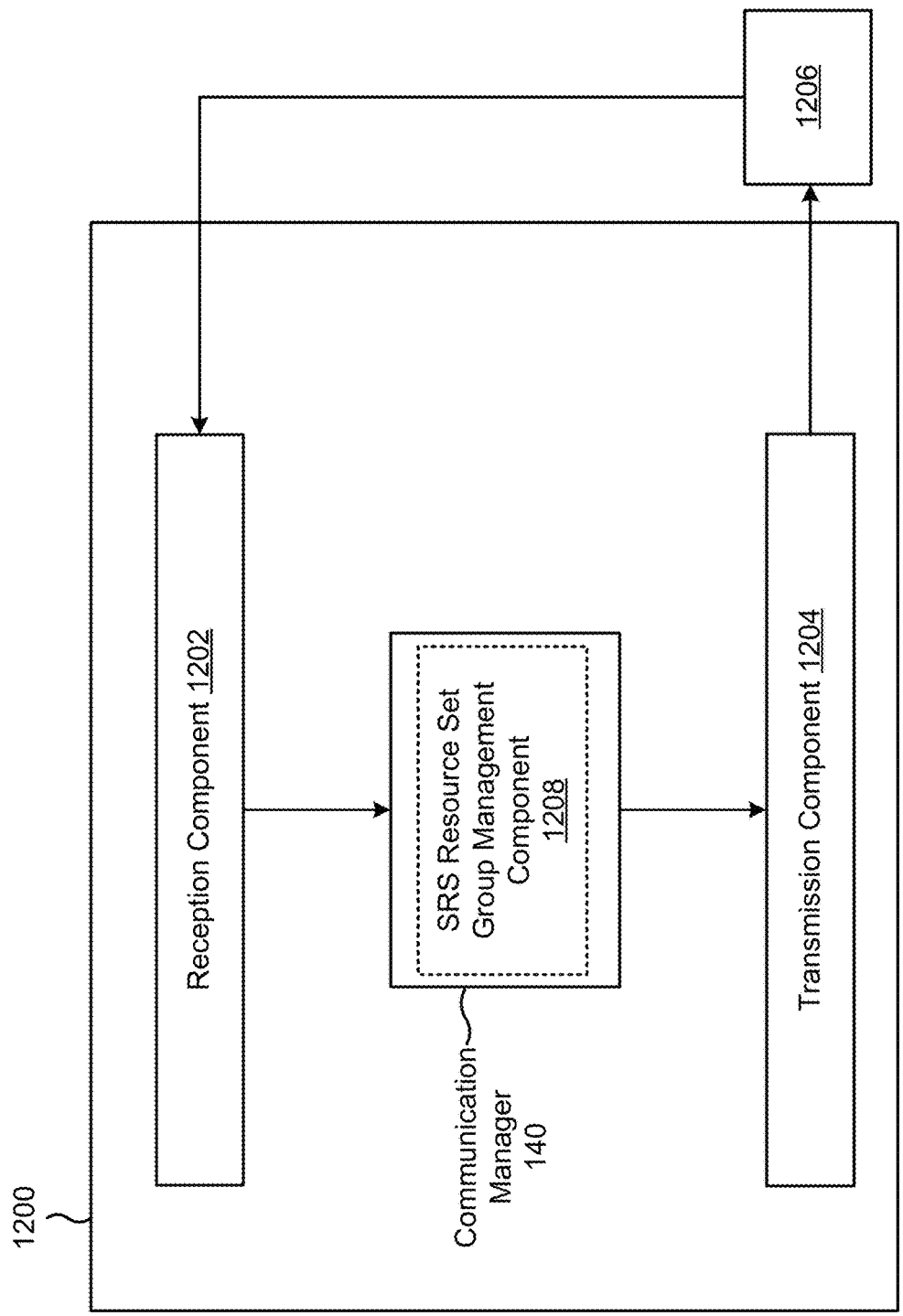
FIG. 12 is a diagram of an example apparatus for wireless communication in accordance with the present disclosure.

FIG. 12 is a diagram of an example apparatus 1200 for wireless communication in accordance with the present disclosure. The apparatus 1200 may be a UE, or a UE may include the apparatus 1200. In some aspects, the apparatus 1200 includes a reception component 1202, a transmission component 1204, and a communication manager 140, which may be in communication with one another (for example, via one or more buses). As shown, the apparatus 1200 may communicate with another apparatus 1206 (such as a UE, a base station, a network entity, or another wireless communication device) using the reception component 1202 and the transmission component 1204.

In some aspects, the apparatus 1200 may be configured to perform one or more operations described herein in connection with FIGS. 6-9. Additionally or alternatively, the apparatus 1200 may be configured to perform one or more processes described herein, such as process 1000 of FIG. 10, or a combination thereof. In some aspects, the apparatus 1200 may include one or more components of the UE described above in connection with FIG. 2.

The reception component 1202 may receive communications, such as reference signals, control information, data communications, or a combination thereof, from the apparatus 1206. The reception component 1202 may provide received communications to one or more other components of the apparatus 1200, such as the communication manager 140. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, the communication manager 140 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The communication manager 140 may receive or may cause the reception component 1202 to receive, from a network entity, configuration information, associated with a first SRS resource set, indicating that a first one or more groups of SRS resource sets, from multiple groups of SRS resource sets, are associated with the first SRS resource set. The communication manager 140 may receive or may cause the reception component 1202 to receive, from the network entity, an indication that a first group, from the multiple groups, is activated for SRS transmissions, the first group being included in the first one or more groups that are associated with the first SRS resource set. The communication manager 140 may transmit or may cause the transmission component 1204 to transmit an SRS using an SRS resource associated with the first SRS resource set based at least in part on the first group being activated and the first group being included in the first one or more groups. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as an SRS resource set group management component 1208, among other examples.

Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive, from a network entity, configuration information, associated with a first SRS resource set, indicating that a first one or more groups of SRS resource sets, from multiple groups of SRS resource sets, are associated with the first SRS resource set. The reception component 1202 may receive, from the network entity, an indication that a first group, from the multiple groups, is activated for SRS transmissions, the first group being included in the first one or more groups that are associated with the first SRS resource set. The transmission component 1204 may transmit an SRS using an SRS resource associated with the first SRS resource set based at least in part on the first group being activated and the first group being included in the first one or more groups.

The reception component 1202 may receive configuration information, associated with a second SRS resource set, indicating that a second one or more groups, from the multiple groups, are associated with the second SRS resource set.

The SRS resource set group management component 1208 may refrain from transmitting SRSs using SRS resources associated with the second SRS resource set based at least in part on the first group being activated and the first group not being included in the second one or more groups.

The reception component 1202 may receive configuration information, associated with a second SRS resource set, that does not indicate which groups, from the multiple groups, are associated with the second SRS resource set.

The reception component 1202 may receive an RRC communication indicating a quantity of the multiple groups.

The SRS resource set group management component 1208 may switch, based at least in part on receiving the indication, from a second group, included in the multiple groups, to the first group in a next slot after an amount of time from a last symbol associated with a communication that includes the indication.

The transmission component 1204 may transmit, to the network entity, a HARQ feedback communication associated with a communication that includes the indication. The SRS resource set group management component 1208 may switch, based at least in part on receiving the indication, from a second group, included in the multiple groups, to the first group in a next slot after an amount of time from a last symbol associated with the HARQ feedback communication.

The reception component 1202 may receive an RRC communication indicating an amount of time associated with the timer.

The reception component 1202 may receive, from the network entity, a MAC-CE communication activating a second SRS resource set, where the second SRS resource set is a semi-persistent SRS resource set, and where the second SRS resource set is associated with a second one or more groups from the multiple groups. The SRS resource set group management component 1208 may refrain from transmitting SRSs using SRS resources associated with the second SRS resource set based at least in part on the first group being activated and the first group not being included in the second one or more groups.

The reception component 1202 may receive, from the network entity, a DCI communication triggering a transmission via a second SRS resource set, where the second SRS resource set is associated with a second one or more groups from the multiple groups. The SRS resource set group management component 1208 may refrain from transmitting SRSs using SRS resources associated with the second SRS resource set based at least in part on the first group being activated and the first group not being included in the second one or more groups.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
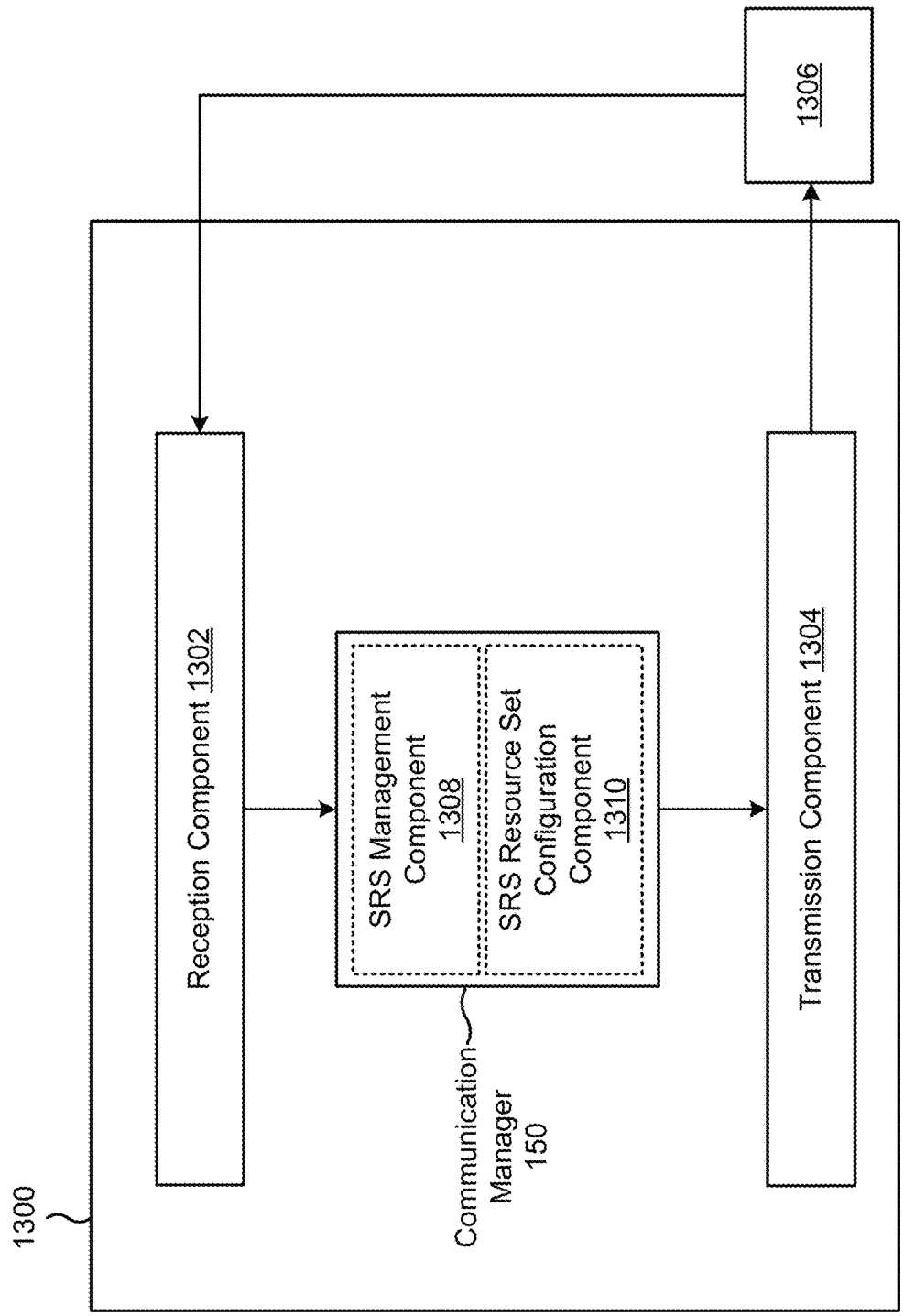
FIG. 13 is a diagram of an example apparatus for wireless communication in accordance with the present disclosure.

FIG. 13 is a diagram of an example apparatus 1300 for wireless communication in accordance with the present disclosure. The apparatus 1300 may be a network entity, or a network entity may include the apparatus 1300. In some aspects, the apparatus 1300 includes a reception component 1302, a transmission component 1304, and a communication manager 150, which may be in communication with one another (for example, via one or more buses). As shown, the apparatus 1300 may communicate with another apparatus 1306 (such as a UE, a base station, a network entity, or another wireless communication device) using the reception component 1302 and the transmission component 1304.

In some aspects, the apparatus 1300 may be configured to perform one or more operations described herein in connection with FIGS. 6-9. Additionally or alternatively, the apparatus 1300 may be configured to perform one or more processes described herein, such as process 1100 of FIG. 11, or a combination thereof. In some aspects, the apparatus 1300 may include one or more components of the network entity described above in connection with FIG. 2.

The reception component 1302 may receive communications, such as reference signals, control information, data communications, or a combination thereof, from the apparatus 1306. The reception component 1302 may provide received communications to one or more other components of the apparatus 1300, such as the communication manager 150. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, a memory, or a combination thereof, of the network entity described above in connection with FIG. 2.

The transmission component 1304 may transmit communications, such as reference signals, control information, data communications, or a combination thereof, to the apparatus 1306. In some aspects, the communication manager 150 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity described above in connection with FIG. 2. In some aspects, the transmission component 1304 may be co-located with the reception component 1302 in a transceiver.

The communication manager 150 may transmit or may cause the transmission component 1304 to transmit configuration information intended for a UE, associated with a first SRS resource set, indicating that a first one or more groups of SRS resource sets, from multiple groups of SRS resource sets, are associated with the first SRS resource set. The communication manager 150 may transmit or may cause the transmission component 1304 to transmit an indication that a first group, from the multiple groups, is activated for SRS transmissions, the first group being included in the first one or more groups that are associated with the first SRS resource set. The communication manager 150 may receive or may cause the reception component 1302 to receive an SRS using an SRS resource associated with the first SRS resource set based at least in part on the first group being activated and the first group being included in the first one or more groups. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the network entity described above in connection with FIG. 2. In some aspects, the communication manager 150 includes a set of components, such as an SRS management component 1308, an SRS resource set configuration component 1310, or a combination thereof. Alternatively, the set of components may be separate and distinct from the communication manager 150. In some aspects, one or more components of the set of components may include or may be implemented within a controller/processor, a memory, a scheduler, a communication unit, or a combination thereof, of the network entity described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1304 may transmit configuration information intended for a UE, associated with a first SRS resource set, indicating that a first one or more groups of SRS resource sets, from multiple groups of SRS resource sets, are associated with the first SRS resource set. The transmission component 1304 may transmit an indication that a first group, from the multiple groups, is activated for SRS transmissions, the first group being included in the first one or more groups that are associated with the first SRS resource set. The reception component 1302 may receive an SRS using an SRS resource associated with the first SRS resource set based at least in part on the first group being activated and the first group being included in the first one or more groups.

The transmission component 1304 may transmit configuration information, associated with a second SRS resource set, indicating that a second one or more groups, from the multiple groups, are associated with the second SRS resource set.

The SRS management component 1308 may refrain from receiving SRSs using SRS resources associated with the second SRS resource set based at least in part on the first group being activated and the first group not being included in the second one or more groups.

The transmission component 1304 may transmit configuration information, associated with a second SRS resource set, that does not indicate which groups, from the multiple groups, are associated with the second SRS resource set. The transmission component 1304 may transmit an RRC communication indicating a quantity of the multiple groups.

The SRS resource set configuration component 1310 may switch, based at least in part on transmitting the indication, from a second group, included in the multiple groups, to the first group in a next slot after an amount of time from a last symbol associated with a communication that includes the indication.

The reception component 1302 may receive a HARQ feedback communication associated with a communication that includes the indication. The SRS resource set configuration component 1310 may switch, based at least in part on transmitting the indication, from a second group, included in the multiple groups, to the first group in a next slot after an amount of time from a last symbol associated with the HARQ feedback communication. The transmission component 1304 may transmit an RRC communication indicating an amount of time associated with the timer.

The transmission component 1304 may transmit a MAC-CE communication activating a second SRS resource set, where the second SRS resource set is a semi-persistent SRS resource set, and where the second SRS resource set is associated with a second one or more groups from the multiple groups. The SRS management component 1308 may refrain from receiving SRSs using SRS resources associated with the second SRS resource set based at least in part on the first group being activated and the first group not being included in the second one or more groups.

The transmission component 1304 may transmit a DCI communication triggering a transmission via a second SRS resource set, where the second SRS resource set is associated with a second one or more groups from the multiple groups. The SRS management component 1308 may refrain from receiving SRSs using SRS resources associated with the second SRS resource set based at least in part on the first group being activated and the first group not being included in the second one or more groups.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, from a network entity, configuration information, associated with a first sounding reference signal (SRS) resource set, indicating that a first one or more groups of SRS resource sets, from multiple groups of SRS resource sets, are associated with the first SRS resource set; receiving, from the network entity, an indication that a first group, from the multiple groups, is activated for SRS transmissions, the first group being included in the first one or more groups that are associated with the first SRS resource set; and transmitting an SRS using an SRS resource associated with the first SRS resource set based at least in part on the first group being activated and the first group being included in the first one or more groups.

Aspect 2: The method of Aspect 1, further comprising: receiving configuration information, associated with a second SRS resource set, indicating that a second one or more groups, from the multiple groups, are associated with the second SRS resource set; and refraining from transmitting SRSs using SRS resources associated with the second SRS resource set based at least in part on the first group being activated and the first group not being included in the second one or more groups.

Aspect 3: The method of any of Aspects 1-2, further comprising receiving configuration information, associated with a second SRS resource set, that does not indicate which groups, from the multiple groups, are associated with the second SRS resource set.

Aspect 4: The method of Aspect 3, wherein the second SRS resource set is associated with all groups from the multiple groups.

Aspect 5: The method of Aspect 3, wherein the second SRS resource set is associated with the first group from the multiple groups, wherein the first group is a default group.

Aspect 6: The method of any of Aspects 1-5, further comprising receiving a radio resource control (RRC) communication indicating a quantity of the multiple groups.

Aspect 7: The method of any of Aspects 1-6, wherein a quantity of the multiple groups is based at least in part on a capability associated with the UE.

Aspect 8: The method of any of Aspects 1-7, further comprising switching, based at least in part on receiving the indication, from a second group, included in the multiple groups, to the first group in a next slot after an amount of time from a last symbol associated with a communication that includes the indication.

Aspect 9: The method of Aspect 8, wherein the communication is a downlink control information (DCI) communication, and wherein the UE does not transmit hybrid automatic repeat request (HARQ) feedback associated with the communication.

Aspect 10: The method of any of Aspects 1-7, further comprising: transmitting, to the network entity, a hybrid automatic repeat request (HARQ) feedback communication associated with a communication that includes the indication; and switching, based at least in part on receiving the indication, from a second group, included in the multiple groups, to the first group in a next slot after an amount of time from a last symbol associated with the HARQ feedback communication.

Aspect 11: The method of Aspect 10, wherein the communication is a downlink control information (DCI) communication or a medium access control (MAC) control element (MAC-CE) communication.

Aspect 12: The method of any of Aspects 1-11, wherein a second group, included in the multiple groups, is a default group, the method further comprising: initiating a timer based at least in part on switching to the first group; and switching from the first group to the second group based at least in part on an expiration of the timer.

Aspect 13: The method of Aspect 12, further comprising receiving a radio resource control (RRC) communication indicating an amount of time associated with the timer.

Aspect 14: The method of any of Aspects 12-13, wherein switching from the first group to the second group comprises switching from the first group to the second group in a next slot after an amount of time from the expiration of the timer.

Aspect 15: The method of any of Aspects 1-14, wherein the first SRS resource set is a semi-persistent SRS resource set or an aperiodic SRS resource set, and wherein the first one or more groups include all groups included in the multiple groups.

Aspect 16: The method of any of Aspects 1-15, wherein the first SRS resource set is a semi-persistent SRS resource set, the method further comprising: receiving, from the network entity, a medium access control (MAC) control element (MAC-CE) communication activating the first SRS resource set, wherein transmitting the SRS is based at least in part on the first group being activated and receiving the MAC-CE communication.

Aspect 17: The method of any of Aspects 1-16, further comprising: receiving, from the network entity, a medium access control (MAC) control element (MAC-CE) communication activating a second SRS resource set, wherein the second SRS resource set is a semi-persistent SRS resource set, and wherein the second SRS resource set is associated with a second one or more groups from the multiple groups; and refraining from transmitting SRSs using SRS resources associated with the second SRS resource set based at least in part on the first group being activated and the first group not being included in the second one or more groups.

Aspect 18: The method of any of Aspects 1-17, wherein the first SRS resource set is an aperiodic SRS resource set, the method further comprising: receiving, from the network entity, a downlink control information (DCI) communication triggering a transmission via the first SRS resource set, wherein transmitting the SRS is based at least in part on the first group being activated and on receiving the DCI communication.

Aspect 19: The method of any of Aspects 1-18, further comprising: receiving, from the network entity, a downlink control information (DCI) communication triggering a transmission via a second SRS resource set, wherein the second SRS resource set is associated with a second one or more groups from the multiple groups; and refraining from transmitting SRSs using SRS resources associated with the second SRS resource set based at least in part on the first group being activated and the first group not being included in the second one or more groups.

Aspect 20: The method of any of Aspects 1-19, wherein the indication is included in at least one of downlink control information (DCI) or a medium access control (MAC) control element (MAC-CE).

Aspect 21: A method of wireless communication performed by a network entity, comprising: transmitting configuration information intended for a user equipment (UE), associated with a first sounding reference signal (SRS)

resource set, indicating that a first one or more groups of SRS resource sets, from multiple groups of SRS resource sets, are associated with the first SRS resource set; transmitting an indication that a first group, from the multiple groups, is activated for SRS transmissions, the first group being included in the first one or more groups that are associated with the first SRS resource set; and receiving an SRS using an SRS resource associated with the first SRS resource set based at least in part on the first group being activated and the first group being included in the first one or more groups.

Aspect 22: The method of Aspect 21, further comprising: transmitting configuration information, associated with a second SRS resource set, indicating that a second one or more groups, from the multiple groups, are associated with the second SRS resource set; and refraining from receiving SRSs using SRS resources associated with the second SRS resource set based at least in part on the first group being activated and the first group not being included in the second one or more groups.

Aspect 23: The method of any of Aspects 21-22, further comprising transmitting configuration information, associated with a second SRS resource set, that does not indicate which groups, from the multiple groups, are associated with the second SRS resource set.

Aspect 24: The method of Aspect 23, wherein the second SRS resource set is associated with all groups from the multiple groups.

Aspect 25: The method of Aspect 23, wherein the second SRS resource set is associated with the first group from the multiple groups, wherein the first group is a default group.

Aspect 26: The method of any of Aspects 21-25, further comprising transmitting a radio resource control (RRC) communication indicating a quantity of the multiple groups.

Aspect 27: The method of any of Aspects 21-26, wherein a quantity of the multiple groups is based at least in part on a capability associated with the UE.

Aspect 28: The method of any of Aspects 21-27, further comprising switching, based at least in part on transmitting the indication, from a second group, included in the multiple groups, to the first group in a next slot after an amount of time from a last symbol associated with a communication that includes the indication.

Aspect 29: The method of Aspect 28, wherein the communication is a downlink control information (DCI) communication, and wherein the network entity does not receive hybrid automatic repeat request (HARQ) feedback associated with the communication.

Aspect 30: The method of any of Aspects 21-27, further comprising: receiving a hybrid automatic repeat request (HARQ) feedback communication associated with a communication that includes the indication; and switching, based at least in part on transmitting the indication, from a second group, included in the multiple groups, to the first group in a next slot after an amount of time from a last symbol associated with the HARQ feedback communication.

Aspect 31: The method of Aspect 30, wherein the communication is a downlink control information (DCI) communication or a medium access control (MAC) control element (MAC-CE) communication.

Aspect 32: The method of any of Aspects 21-31, wherein a second group, included in the multiple groups, is a default group, the method further comprising: initiating a timer based at least in part on transmitting the indication; and switching from the first group to the second group based at least in part on an expiration of the timer.

Aspect 33: The method of Aspect 32, further comprising transmitting a radio resource control (RRC) communication indicating an amount of time associated with the timer.

Aspect 34: The method of any of Aspects 32-33, wherein switching from the first group to the second group comprises switching from the first group to the second group in a next slot after an amount of time from the expiration of the timer.

Aspect 35: The method of any of Aspects 21-34, wherein the first SRS resource set is a semi-persistent SRS resource set or an aperiodic SRS resource set, and wherein the first one or more groups include all groups included in the multiple groups.

Aspect 36: The method of any of Aspects 21-35, wherein the first SRS resource set is a semi-persistent SRS resource set, the method further comprising: transmitting a medium access control (MAC) control element (MAC-CE) communication activating the first SRS resource set, wherein receiving the SRS is based at least in part on the first group being activated and transmitting the MAC-CE communication.

Aspect 37: The method of any of Aspects 21-36, further comprising: transmitting a medium access control (MAC) control element (MAC-CE) communication activating a second SRS resource set, wherein the second SRS resource set is a semi-persistent SRS resource set, and wherein the second SRS resource set is associated with a second one or more groups from the multiple groups; and refraining from receiving SRSs using SRS resources associated with the second SRS resource set based at least in part on the first group being activated and the first group not being included in the second one or more groups.

Aspect 38: The method of any of Aspects 21-37, wherein the first SRS resource set is an aperiodic SRS resource set, the method further comprising: transmitting a downlink control information (DCI) communication triggering a transmission by the UE via the first SRS resource set, wherein transmitting the SRS is based at least in part on the first group being activated and on transmitting the DCI communication.

Aspect 39: The method of any of Aspects 21-38, further comprising: transmitting a downlink control information (DCI) communication triggering a transmission via a second SRS resource set, wherein the second SRS resource set is associated with a second one or more groups from the multiple groups; and refraining from receiving SRSs using SRS resources associated with the second SRS resource set based at least in part on the first group being activated and the first group not being included in the second one or more groups.

Aspect 40: The method of any of Aspects 21-39, wherein the indication is included in at least one of downlink control information (DCI) or a medium access control (MAC) control element (MAC-CE).

Aspect 41: An apparatus for wireless communication at a device, comprising a processor; memory coupled with the processor; and instructions stored in the memory and executable by the processor to cause the apparatus to perform the method of one or more of Aspects 1-20.

Aspect 42: A device for wireless communication, comprising a memory and one or more processors coupled to the memory, the one or more processors configured to perform the method of one or more of Aspects 1-20.

Aspect 43: An apparatus for wireless communication, comprising at least one means for performing the method of one or more of Aspects 1-20.

Aspect 44: A non-transitory computer-readable medium storing code for wireless communication, the code comprising instructions executable by a processor to perform the method of one or more of Aspects 1-20.

Aspect 45: A non-transitory computer-readable medium storing a set of instructions for wireless communication, the set of instructions comprising one or more instructions that, when executed by one or more processors of a device, cause the device to perform the method of one or more of Aspects 1-20.

Aspect 46: An apparatus for wireless communication at a device, comprising a processor; memory coupled with the processor; and instructions stored in the memory and executable by the processor to cause the apparatus to perform the method of one or more of Aspects 21-40.

Aspect 47: A device for wireless communication, comprising a memory and one or more processors coupled to the memory, the one or more processors configured to perform the method of one or more of Aspects 21-40.

Aspect 48: An apparatus for wireless communication, comprising at least one means for performing the method of one or more of Aspects 21-40.

Aspect 49: A non-transitory computer-readable medium storing code for wireless communication, the code comprising instructions executable by a processor to perform the method of one or more of Aspects 21-40.

Aspect 50: A non-transitory computer-readable medium storing a set of instructions for wireless communication, the set of instructions comprising one or more instructions that, when executed by one or more processors of a device, cause the device to perform the method of one or more of Aspects 21-40.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. An apparatus for wireless communication at a user equipment (UE), comprising:
    one or more memories storing processor-executable code; and
    one or more processors coupled with the one or more memories, at least one processor of the one or more processors configured to cause the apparatus to:
        receive, from a network entity, configuration information, associated with a first sounding reference signal (SRS) resource set, indicating that a first one or more groups of SRS resource sets, from multiple groups of SRS resource sets, are associated with the first SRS resource set;
        receive, from the network entity, an indication that a first group of SRS resource sets, from the multiple groups, is activated for SRS transmissions, the first group being included in the first one or more groups that are associated with the first SRS resource set;
        transmit an SRS using an SRS resource associated with the first SRS resource set based at least in part on the first group being activated and the first group being included in the first one or more groups;
        transmit, to the network entity, a hybrid automatic repeat request (HARQ) feedback communication associated with a communication that includes the indication; and
        switch, based at least in part on receiving the indication, from a second group of SRS resource sets, included in the multiple groups, to the first group in a next slot after an amount of time from a last symbol associated with the HARQ feedback communication.

2. The apparatus of claim 1, wherein the at least one processor is further configured to cause the apparatus to:
receive configuration information, associated with a second SRS resource set, indicating that a second one or more groups of SRS resource sets, from the multiple groups, are associated with the second SRS resource set; and
refrain from transmitting SRSs using SRS resources associated with the second SRS resource set based at least in part on the first group being activated and the first group not being included in the second one or more groups.

3. The apparatus of claim 1, wherein the at least one processor is further configured to cause the apparatus to receive configuration information, associated with a second SRS resource set, that does not indicate which groups of SRS resource sets, from the multiple groups, are associated with the second SRS resource set.

4. The apparatus of claim 3, wherein the second SRS resource set is associated with all groups of SRS resource sets from the multiple groups or a default group of SRS resource sets.

5. The apparatus of claim 1, wherein the at least one processor is further configured to cause the apparatus to switch, based at least in part on receiving the indication, from a second group of SRS resource sets, included in the multiple groups, to the first group in a next slot after an amount of time from a last symbol associated with a communication that includes the indication.

6. The apparatus of claim 5, wherein the communication is a downlink control information (DCI) communication, and wherein the UE does not transmit hybrid automatic repeat request (HARQ) feedback associated with the communication.

7. The apparatus of claim 1, wherein a second group of SRS resource sets, included in the multiple groups, is a default group of SRS resource sets, and wherein the at least one processor is further configured to cause the apparatus to:
initiate a timer based at least in part on switching to the first group; and
switch from the first group to the second group based at least in part on an expiration of the timer.

8. The apparatus of claim 7, wherein, to cause the apparatus to switch from the first group to the second group, the at least one processor is configured to cause the apparatus to switch from the first group to the second group in a next slot after an amount of time from the expiration of the timer.

9. The apparatus of claim 1, wherein the at least one processor is further configured to cause the apparatus to:
receive, from the network entity, a medium access control (MAC) control element (MAC-CE) communication activating a second SRS resource set, wherein the second SRS resource set is a semi-persistent SRS resource set, and wherein the second SRS resource set is associated with a second one or more groups of SRS resource sets from the multiple groups; and
refrain from transmitting SRSs using SRS resources associated with the second SRS resource set based at least in part on the first group being activated and the first group not being included in the second one or more groups.

10. The apparatus of claim 1, wherein the at least one processor is further configured to cause the apparatus to:
receive, from the network entity, a downlink control information (DCI) communication triggering a transmission via a second SRS resource set, wherein the second SRS resource set is associated with a second one or more groups of SRS resource sets from the multiple groups; and
refrain from transmitting SRSs using SRS resources associated with the second SRS resource set based at least in part on the first group being activated and the first group not being included in the second one or more groups.

11. The apparatus of claim 1, wherein different groups of SRS resource sets include resource sets associated with different SRS configuration parameters.

12. An apparatus for wireless communication at a network entity, comprising:
one or more memories; and
one or more processors coupled with the one or more memories, at least one processor of the one or more processors configured to cause the apparatus to:
transmit configuration information intended for a user equipment (UE), associated with a first sounding reference signal (SRS) resource set, indicating that a first one or more groups of SRS resource sets, from multiple groups of SRS resource sets, are associated with the first SRS resource set;
transmit an indication that a first group of SRS resource sets, from the multiple groups, is activated for SRS transmissions, the first group being included in the first one or more groups that are associated with the first SRS resource set;
receive an SRS using an SRS resource associated with the first SRS resource set based at least in part on the first group being activated and the first group being included in the first one or more groups;
receive a hybrid automatic repeat request (HARQ) feedback communication associated with a communication that includes the indication, wherein a switch occurs, based at least in part on transmitting the indication, from a second group of SRS resource sets, included in the multiple groups, to the first group in a next slot after an amount of time from a last symbol associated with the HARQ feedback communication.

13. The apparatus of claim 12, wherein the at least one processor is further configured to cause the apparatus to:
transmit configuration information, associated with a second SRS resource set, indicating that a second one or more groups of SRS resource sets, from the multiple groups, are associated with the second SRS resource set; and
refrain from receiving SRSs using SRS resources associated with the second SRS resource set based at least in part on the first group being activated and the first group not being included in the second one or more groups.

14. The apparatus of claim 12, wherein the at least one processor is further configured to cause the apparatus to transmit a radio resource control (RRC) communication indicating a quantity of the multiple groups.

15. The apparatus of claim 12, wherein the at least one processor is further configured to cause the apparatus to switch, based at least in part on transmitting the indication, from a second group of SRS resource sets, included in the multiple groups, to the first group in a next slot after an amount of time from a last symbol associated with a communication that includes the indication.

16. A method of wireless communication performed at a user equipment (UE), comprising:

receiving, from a network entity, configuration information, associated with a first sounding reference signal (SRS) resource set, indicating that a first one or more groups of SRS resource sets, from multiple groups of SRS resource sets, are associated with the first SRS resource set;

receiving, from the network entity, an indication that a first group of SRS resource sets, from the multiple groups, is activated for SRS transmissions, the first group being included in the first one or more groups that are associated with the first SRS resource set;

transmitting an SRS using an SRS resource associated with the first SRS resource set based at least in part on the first group being activated and the first group being included in the first one or more groups;

transmitting, to the network entity, a hybrid automatic repeat request (HARQ) feedback communication associated with a communication that includes the indication; and switching, based at least in part on receiving the indication, from a second group of SRS resource sets, included in the multiple groups, to the first group in a next slot after an amount of time from a last symbol associated with the HARQ feedback communication.

17. The method of claim 16, further comprising:
receiving configuration information, associated with a second SRS resource set, indicating that a second one or more groups of SRS resource sets, from the multiple groups, are associated with the second SRS resource set; and
refraining from transmitting SRSs using SRS resources associated with the second SRS resource set based at least in part on the first group being activated and the first group not being included in the second one or more groups.

18. The method of claim 16, further comprising receiving configuration information, associated with a second SRS resource set, that does not indicate which groups of SRS resource sets, from the multiple groups, are associated with the second SRS resource set, and wherein the second SRS resource set is associated with all groups of SRS resource sets from the multiple groups or a default group of SRS resource sets.

19. The method of claim 16, further comprising switching, based at least in part on receiving the indication, from a second group of SRS resource sets, included in the multiple groups, to the first group in a next slot after an amount of time from a last symbol associated with a communication that includes the indication.

20. The method of claim 19, wherein the communication is a downlink control information (DCI) communication, and wherein the UE does not transmit hybrid automatic repeat request (HARQ) feedback associated with the communication.

21. The method of claim 16, wherein a second group of SRS resource sets, included in the multiple groups, is a default group of SRS resource sets, the method further comprising:
initiating a timer based at least in part on switching to the first group; and
switching from the first group to the second group based at least in part on an expiration of the timer.

22. The method of claim 21, further comprising receiving a radio resource control (RRC) communication indicating an amount of time associated with the timer.

23. The method of claim 21, wherein switching from the first group to the second group comprises switching from the first group to the second group in a next slot after an amount of time from the expiration of the timer.

24. The method of claim 16, wherein the first SRS resource set is a semi-persistent SRS resource set, the method further comprising:
receiving, from the network entity, a medium access control (MAC) control element (MAC-CE) communication activating the first SRS resource set,
wherein transmitting the SRS is based at least in part on the first group being activated and receiving the MAC-CE communication.

25. The method of claim 16, wherein the first SRS resource set is an aperiodic SRS resource set, the method further comprising:
receiving, from the network entity, a downlink control information (DCI) communication triggering a transmission via the first SRS resource set,
wherein transmitting the SRS is based at least in part on the first group being activated and on receiving the DCI communication.

26. A method of wireless communication performed at a network entity, comprising:
transmitting configuration information intended for a user equipment (UE), associated with a first sounding reference signal (SRS) resource set, indicating that a first one or more groups of SRS resource sets, from multiple groups of SRS resource sets, are associated with the first SRS resource set;
transmitting an indication that a first group of SRS resource sets, from the multiple groups, is activated for SRS transmissions, the first group being included in the first one or more groups that are associated with the first SRS resource set;
receiving an SRS using an SRS resource associated with the first SRS resource set based at least in part on the first group being activated and the first group being included in the first one or more groups; and
receiving a hybrid automatic repeat request (HARQ) feedback communication associated with a communication that includes the indication, wherein a switch occurs, based at least in part on transmitting the indication, from a second group of SRS resource sets, included in the multiple groups, to the first group in a next slot after an amount of time from a last symbol associated with the HARQ feedback communication.

27. The method of claim 26, further comprising:
transmitting configuration information, associated with a second SRS resource set, indicating that a second one or more groups of SRS resource sets, from the multiple groups, are associated with the second SRS resource set; and
refraining from receiving SRSs using SRS resources associated with the second SRS resource set based at least in part on the first group being activated and the first group not being included in the second one or more groups.

* * * * *